(12) United States Patent
Crouse et al.

(10) Patent No.: US 11,676,231 B1
(45) Date of Patent: *Jun. 13, 2023

(54) AGGREGATING PROCEDURES FOR AUTOMATIC DOCUMENT ANALYSIS

(71) Applicant: AON RISK SERVICES, INC. OF MARYLAND, New York, NY (US)

(72) Inventors: Daniel Crouse, Seattle, WA (US); John E. Bradley, III, Duvall, WA (US); Lewis C. Lee, Spokane, WA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 318 days.

This patent is subject to a terminal disclaimer.

(21) Appl. No.: 16/733,656

(22) Filed: Jan. 3, 2020

Related U.S. Application Data

(63) Continuation-in-part of application No. 15/450,655, filed on Mar. 6, 2017, now Pat. No. 10,528,609.

(51) Int. Cl.
*G06F 16/16* (2019.01)
*G06Q 50/18* (2012.01)
(Continued)

(52) U.S. Cl.
CPC ......... *G06Q 50/184* (2013.01); *G06F 16/164* (2019.01); *G06F 16/906* (2019.01); *G06F 16/93* (2019.01)

(58) Field of Classification Search
None
See application file for complete search history.

(56) References Cited

U.S. PATENT DOCUMENTS

| 7,958,136 B1 | 6/2011 | Curtis et al. |
| 8,402,030 B1 | 3/2013 | Pyle et al. |

(Continued)

OTHER PUBLICATIONS

Jiafeng guo; A Deep Relevance Matching Model for Ad-hoc Retrieval; ACM;2016; pp. 55-64 (Year: 2016).*

(Continued)

*Primary Examiner* — Amresh Singh
*Assistant Examiner* — Jermaine A Mincey
(74) *Attorney, Agent, or Firm* — Lee & Hayes, P.C.

(57) ABSTRACT

This disclosure describes, in part, techniques for performing automatic document analysis. For instance, one or more computing devices may obtain a plurality of documents for analysis. The one or more computing devices may then analyze the documents to determine a respective comparative breadth score representing a breadth of each document, a respective comparative portion count score representing a number of documents portions included in each document, and a respective comparative differentiation score representing differentiation between the documents portions included in each document. In some instances, the one or more computing devices determine each of the scores based on comparing the respective breadth, respective number of document portions, and respective differentiation for each of the documents under analysis. The one or more computing devices can then determine a comprehensive score for each document using the respective scores, and generate a user interface that includes the overall scores.

20 Claims, 11 Drawing Sheets

(51) Int. Cl.
*G06F 16/93* (2019.01)
*G06F 16/906* (2019.01)

(56) References Cited

U.S. PATENT DOCUMENTS

| | | | |
|---|---|---|---|
| 10,133,791 B1* | 11/2018 | Chan | G06F 16/2465 |
| 2004/0181427 A1 | 9/2004 | Stobbs et al. | |
| 2004/0220842 A1 | 11/2004 | Barney | |
| 2007/0294232 A1* | 12/2007 | Gibbs | G06F 16/951 |
| 2014/0280167 A1* | 9/2014 | Ghessassi | G06F 40/186 |
| | | | 707/738 |
| 2015/0379887 A1* | 12/2015 | Becker | G06F 16/93 |
| | | | 715/229 |
| 2018/0253486 A1 | 9/2018 | Crouse et al. | |

OTHER PUBLICATIONS

Office action for U.S. Appl. No. 15/450,655, dated Mar. 21, 2019, Crouse, "Aggregating Procedures for Automatic Document Analysis", 23 pages.

The PCT Search Report and Written Opinion dated Apr. 26, 2018, for PCT Application No. PCT/US18/19866, 10 pages.

Quoc, "Distributed Representations of Sentences and Documents", retrieved on Sep. 10, 2019 at Google, Proceedings of the 31st International Conference on Machine Learning, JMLR: W&CP vol. 32, published 2014, pp. 1-9.

\* cited by examiner

AGGREGATING PROCEDURES FOR AUTOMATIC DOCUMENT ANALYSIS

CROSS REFERENCE TO RELATED APPLICATIONS

This application is a continuation of, and claims priority to U.S. patent application Ser. No. 15/450,655, filed on Mar. 6, 2017, entitled "Aggregating Procedures for Automatic Document Analysis," the contents of which are herein incorporated by reference.

BACKGROUND

The amount of information contained in documents is rapidly increasing. There are many industries such as law, education, journalism, politics, economics, or the like that may benefit from rapid and low-cost document analysis. Yet even with recent advances in artificial intelligence and computing, manual analysis still provides the best results for many document analysis tasks that involve subjective judgment and expert knowledge. However, the cost and relatively slow speed of manual, human analysis makes it effectively impossible or impracticable to perform document analysis at the scale, speed, and cost desired in many industries.

"Offshoring" to take advantage of lower costs may allow the hiring of a larger number of people to analyze documents at a lower price per hour of labor. Even so, there is a lower bound on costs and an upper bound on throughput. For example, analyzing a corpus of a million 30-page text documents overnight would be impossible using only human analysis. Automated document analysis using computers is much quicker than human analysis and performs at much lower cost. However, for analytical tasks involving subjective judgment, computers perform much worse than humans. Thus, devices and methods that can analyze documents in a way that emulates human analysis will have broad application across many different industries. Additionally, devices and methods that can analyze documents using unified rules may provide a more consistent analysis. For example, human analysis may include subjective differences when analyzing documents, which may provide for less useful results.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
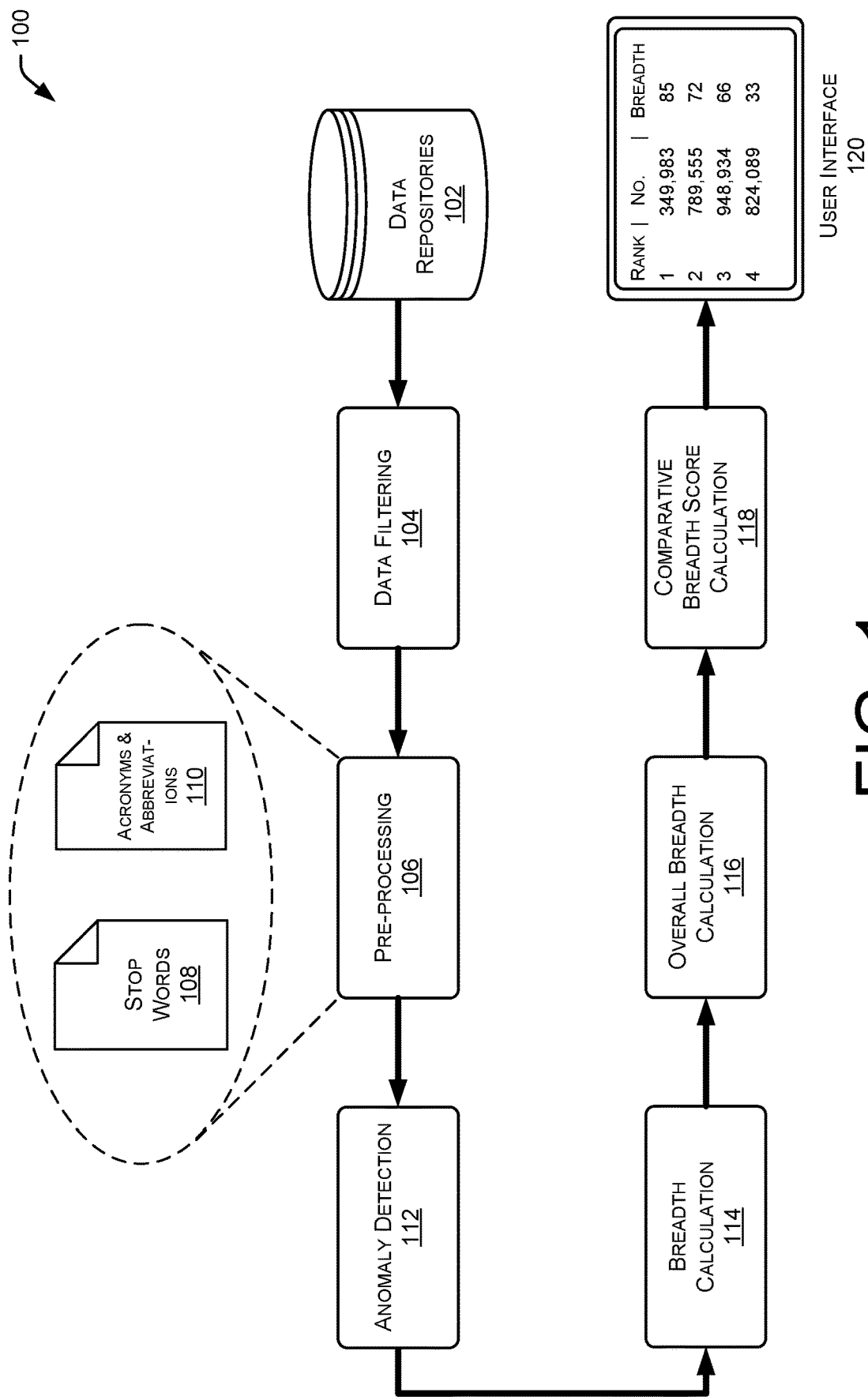
FIG. 1 illustrates an example processing pipeline for generating a user interface showing results of automatic document analysis that are based on breadths of respective documents.

This disclosure describes, in part, techniques for performing automatic document analysis. For instance, documents stored in one or more data repositories may be accessed automatically by one or more computing devices and analyzed based on one or more rule sets. The format, structure, and contents of any document stored in the data repositories may be initially unknown. Thus, in some instances, part of the analysis may include filtering documents from a data repository and pre-processing the documents to identify those that are suitable for further analysis. Examples of document types that may be analyzed include, but are not limited to, issued patents and published patent applications. The analysis may focus on specific portions of the documents such as, for example, abstracts or patent claims. Pre-processing may modify the document portions by standardizing the content and removing content that could negatively affect subsequent analysis through techniques such as stop word removal, stemming, and removal of duplicate words.

In some instances, the documents may be analyzed in order to determine (e.g., calculate) comparative breadth scores associated with breadths of the documents. For instance, in some examples, breadth of document portions may be analyzed based on consideration of word count and commonality of words. Thus, the number of unique words and the frequency with which those words appear in other document portions (e.g., document portions of other documents) are the basis for automatically assigning a breadth score to a given document portion. For instance, for a given document portion of a given document, the word count is compared to the word count of other document portions in the same analysis. Similarly, a commonness score is determined for the given document portion based on the commonality of words in that document portion as compared to the commonality of words in other document portions from the same analysis. An overall breadth score of the given document can then be determined based on the breadth scores of the document portions within the given document. Based on the overall breadth scores of the documents, a comparative breadth score associated with the breadth of each of the documents is determined by comparing the overall breadth score for a respective document to overall breadth scores of the other documents in the same analysis.

In some instances, the documents may be analyzed in order to determine (e.g., calculate) comparative portion count scores associated with the number of document portions that are included in the documents. For instance, a given document may be analyzed to determine a number of document portions that are included in the given document. The comparative portion count score for the given document is then determined by comparing the number of document portions within the given document to the number of document portions that are included in other documents in the same analysis. For instance, if the given document includes a patent, the patent may be analyzed to determine a number of claims within the patent. The number of claims within the patent is then compared to the number of claims within other patents that are being analyzed in order to determine the comparative portion count score for the patent. In some instance, when analyzing patents, analyzing the number of claims may include comparing the number of independent claims and/or number of dependent claims within the patent to the number of independent claims and/or number of dependent claims within the other patents. For instance, independent claims or dependent claims may be given more weight during the analysis to determine the comparative portion count scores.

In some instances, the documents may be analyzed in order to determine (e.g., calculate) comparative differentiation scores associated with differentiations between document portions within the documents. For instance, in some examples, differentiation of document portions may be analyzed based on consideration of word counts and differentiation of words between document portions within a given document. For example, for a given document portion of a given document, a number of the words within the given document portion is determined. Additionally, words in the given document portion are compared to words in at least one other document portion (e.g., the broadest document portion) in the given document to determine a number of words in the given document portion that are unique (e.g., not included in the at least one other document portion). A differentiation score for the given document portion is the determined based on the number of words and the number of unique words. For instance, if the document portion includes ten words, and the number of unique words is five, the differentiation score for the given document portion may be 50%. An overall differentiation score is then determined for the given document based on the differentiation scores of one or more of the document portions of the given document. Based on the overall differentiation scores for the documents, a comparative differentiation score of each of the documents is determined based on comparing the overall differentiation score for a respective document to overall differentiation scores of the other documents in the same analysis.

In some instances, a comprehensive score is determined (e.g., calculated) for the each of the documents in the analysis based on the respective comparative breadth score, the respective comparative portion count score, and the respective comparative differentiation score for a respective document. For example, for a given document, the comprehensive score can include an average (and/or mean, mode, lowest score, highest score, etc.) of the comparative breadth score, the comparative portion count score, and the comparative differentiation score of the given document. For another example, for a given document, the comprehensive score can include a weighted average (and/or weighted mean, weighted mode, weighted lowest score, weighted highest score, etc.) of the comparative breadth score, the comparative portion count score, and/or the comparative differentiation score. For instance, the comparative breadth score may be multiplied by a first weight to determine a weighted breadth score, the comparative portion count score may be multiplied by a second weight to determine a weighted portion score, and the comparative differentiation score may be multiplied by a third weight to determine a weighted differentiation score. The comprehensive score for the document can then be determined based on an average (and/or mean, mode, lowest score, highest score, etc.) of the weighted breadth score, the weighted portion count score, and the weighted differentiation score.

In some instances, a user interface is generated and used to provide scores based on the analysis. For instance, the user interface may include a list of each of the documents from the analysis. The user interface may further include the comparative breadth score, the comparative portion count score, the comparative differentiation score, and the comprehensive score for each of the documents. As such, a user viewing the user interface can quickly determine a quality for each of the documents based on the final scores. For instance, if the documents include patents, the user can quickly determine a property right of a patent relative to other patents that are part of the same analysis.

FIG. 1 illustrates an example analysis pipeline 100 for automatically analyzing and presenting breadth information derived from multiple documents. The documents may come from one or more data repositories 102. The documents may be any type of document such as issued patents, published patent applications, scholarly articles, news articles, financial statements, etc. The documents may also be available in any one of multiple different formats such as plaintext, hypertext markup language (HTML), comma separated values (CSV), or images such as portable document format (PDF) or Tag Image File Format (TIFF) files. In some document formats, such as, for example, HTML and CSV, portions and attributes of the documents may be individually identified. For example, the patent number may be placed in a column for patent numbers in a CSV file or labeled with a tag <patent number> in an HTML file. Similarly, the claim section may be identified as a claim section. In other file formats, such as, for example plaintext or PDF, the documents may not contain any such identifying information or metadata.

The format and/or file type of documents received from one of the data repositories 102 may be initially unknown when that document enters the analysis pipeline 100. Thus, at the start, part of the initial analysis may include identifying the file format and/or type of document. Some level of processing may be necessary for all documents and certain types of files such as image files or text files lacking metadata may require more extensive processing before further analysis can begin. In some instances, the data repositories 102 may include both issued patents and published applications for utility, design, and/or plant patents. Patent data from various jurisdictions and in various languages may also be included in the data repositories 102. Examples of data repositories 102 include a patent database provided by Innography®, the U.S. Patent Database maintained by the United States Patent Trademark Office, patent data maintained by Relacura, as well as patent databases maintained by others such as the patent offices of various jurisdictions.

Data filtering 104 can limit the data obtained from the data repositories 102 to a corpus of documents that share specified characteristics. This may be particularly useful when the documents come from multiple different sources and/or the documents are obtained without knowledge of the document format. For example, the data filtering 104 may limit patent documents to only issued patents and exclude published patent applications. Data filtering 104 may filter by patent type and, for example, keep utility patents while excluding design and plant patents. Data filtering 104 may also filter documents by language, by author, by inventor, by assignee, by technical field, by classification, etc. Filters may be specified by user-generated input through a user interface. In one implementation, the user interface for specifying how data is to be filtered may be a command-line interface. Arguments passed on the command line are parsed by appropriate code to determine an input data set and/or filters to apply to incoming data.

Pre-processing 106 can modify the documents or portions of the documents for later processing. Pre-processing 106 may include stripping out punctuation, removing stop words 108, converting acronyms and abbreviations 110 to full words, stemming, and/or removing duplicate words. Stop words 108 are words that are filtered out before additional processing. Punctuation may include any of the following marks: . , ! ? , ; : ' " @ # $ % ^ & * ( ) [ ] < > / \ - – — °. Stop word usually refer to the most common words in a language. Stop words may include short function words such as "the" "is," "at," "which," and "on," as well as others. However, there is no universal list of stop words. Stop words 108 may be compared to individual documents or portions of the documents and any matching words removed. The stop words 108 may be included directly in the code of a pre-processing algorithm. Additionally or alternatively, the stop words 108 may be included in a list that is accessed to identify stop words 108. The list may be editable to add or remove stop words 108. Multiple lists of stop words 108 may be available. Particular stop words 108 may be selected based on the type of documents being analyzed. For example, patent specific stop words 108 may include words such as "method" or "comprising" that would not typically be included in a list of general stop words. Similarly, if the data filtering 104 restricts the documents to a specific technical area, the stop words 108 may include words specific to the technical area.

Anomaly detection 112 identifies portions of documents that likely include an anomaly which will result in the portion of the document being excluded from further analysis or being flagged to alert a human user that there may be reasons to manually review the flagged document portion. In one implementation, the analysis may be performed only on independent patent claims. However, the data filtering 104 and the pre-processing 106 may create document portions that include both independent and dependent patent claims. Due to the limits of automatic computer-based document analysis, there are some characteristics which may be detectable, but the automatic analysis system will be unable to properly analyze for breadth. Flagging or otherwise indicating such content allows humans to focus manual review efforts on only those document portions that were not fully amenable to the automatic analytical techniques.

Breadth calculation 114 determines the breadth of one or more portions of a document. In some instances, breadth is a subjective concept that is represented in a form amenable for automatic analysis by considering word count and commonality of words. Word count is simply the number of words in a document portion. Words may be counted based on the raw input following data filtering 104 or after some level of pre-processing 106. For example, word count may be performed after removal of duplicate words so that it is a word count of unique words. Also, word count may be performed before or after removing stop words 108. Similarly, word count may be performed before or after converting acronyms and abbreviations 110 into their full word representations. In the context of patent claims, short claims are generally considered broader than longer claims.

Commonality of words represents the frequency that a given word is found within a corpus of documents or document portions. Generally the relevant corpus is the output of the pre-processing 106. For example, if the starting documents from the data repositories 102 were academic papers on chemistry, and preprocessing limited corpus to the abstracts of those papers, then the commonality of a word would be based on the frequency that word is found throughout all the abstracts. Common words correlate with greater breadth while the presence of intricately found words indicates reduced breadth. In the context of patent claims, claims that include words that are often found in the technical field are generally considered broader than claims with uncommon words.

The breadth calculation 114 combines both word count and word commonality to assign a breadth score to a document portion. Specific techniques for determining word count, word commonality, and breadth score are discussed below. Some documents may have multiple portions that are scored. For example, an abstract and an executive summary of a financial document could be scored. For another example, a single patent document may score independent and dependent claims, and each of one or more independent claim and/or each of one or more dependent claims may be assigned a different breadth score.

Overall breadth calculation 116 determines the overall breadth scores for the documents being analyzed. In some instances, the overall breadth score of a document may be the breadth of its broadest portion, such as the breadth score of the broadest claim (e.g., broadest independent claim) of a patent document. In some instances, the overall breadth score of a document may be the breadth of its narrowest portion, such as the breadth score of the narrowest claim of a patent document. Still, in some instances, the overall breadth score of a document may be based on the breadth score(s) of two or more of the document portions. For example, the overall breadth score for a document may include a median or average of breadth scores of each of the document portions of the document. As a further example, the overall breadth score for a document may be based on the range of breadth scores between the breadth of the broadest portion and the breadth of the narrowest portion. In some instances, the overall breadth score may be represented by more than one score (e.g., the broadest breadth score, the average, median, or mean breadth score, the range of breadth scores) of the document portions or may be a composite (e.g., weighted or unweighted average) of such scores. In some instances, one or more of the document portions may be give a greater weight when determining the overall depth score. For example, independent claims may be given a greater weight than dependent claims when determining the overall breadth score of a patent.

The comparative breadth score calculation 118 can determine comparative breadth scores for the documents as compared to other documents within the analysis. For instance, the overall breadth calculation 116 is performed in the context of the other documents in a corpus. Thus, an overall breadth score for a document is not an absolute score, but a relative score compared to other documents that are part of the same analysis. To determine a comparative breadth score for a document as compared to other documents, the comparative breadth score calculation 118 compares the overall breadth score of the document to the overall breadth scores of other documents that are within the analysis. For example, where the overall breadth score is based on the score of a single document portion (e.g., broadest or narrowest), the calculation 118 compares that score to the score of the corresponding single document portion of other documents that are within the analysis. Where the overall breadth score is based on the score of multiple document portions (e.g., represented as an average, median, or mean; a weighted or unweighted composite of the broadest, average (or median or mean), and narrowest or range score; or individual component scores such as broadest, average, and range), the calculation 118 compares that score or scores to the score or scores of the corresponding multiple document portions of other documents within the analysis. In some instances, the comparative breadth score for a document corresponds to the percentage of documents that include an overall breadth score that is equal to or less than the overall breadth score of the document. In some instances, the comparative breadth score for a document corresponds to the percentage of documents that include an overall breadth score that is less than the overall breadth score of the document. In some instances, the comparative breadth score for a document corresponds to the percentage of documents that include an overall breadth score that is equal to or greater than the overall breadth score of the document. Still, in some instances, the comparative breadth score for a document corresponds to the percentage of documents that include an overall breadth score that is greater than the overall breadth score of the document.

In some instances, the design for the analysis captures the idea of comparing apples to apples when calculating comprehensive breadth scores. For instance, comparison of the breadth of a biotechnology patent to the breadth of a mechanical patent is less meaningful than comparing the breadth of one software patent to the breadth another software patent. Because the documents are given overall breadth scores with respect to the other documents in the same corpus, those overall breadth scores may be utilized to determine the comprehensive breadth scores for each of the documents.

The user interface 120 may display, or otherwise present to a user, the comparative breadth scores, rankings based on the comparative breadth scores, and an identifier for each of the analyzed documents. The identifier for each of the documents may be a unique identifier such as a patent number, a published patent application number, an international standard book number (ISBN), a title, a universal resource identifier (URI), etc. The user interface (UI) 120 may be generated by processing a text file or other textual output. The UI 120 may be implemented as a command line interface, as a graphical user interface, or as another type of interface. When implement it as a graphical user interface, the UI 120 may be generated by a cloud service that is accessible over a communications network such as the Internet. Cloud services do not require end user knowledge of the physical location or configuration of the system that delivers the services. Common names associated with cloud services include "software as a service" or "SaaS", "platform computer", "on-dash demand computing," and so on. Any number of users may access the UI 120 any time through specialized applications or through browsers (e.g., Internet Explorer®, Firefox®, Safari®, Google Chrome®, etc.) resident on their local computing devices.

Figure 2:
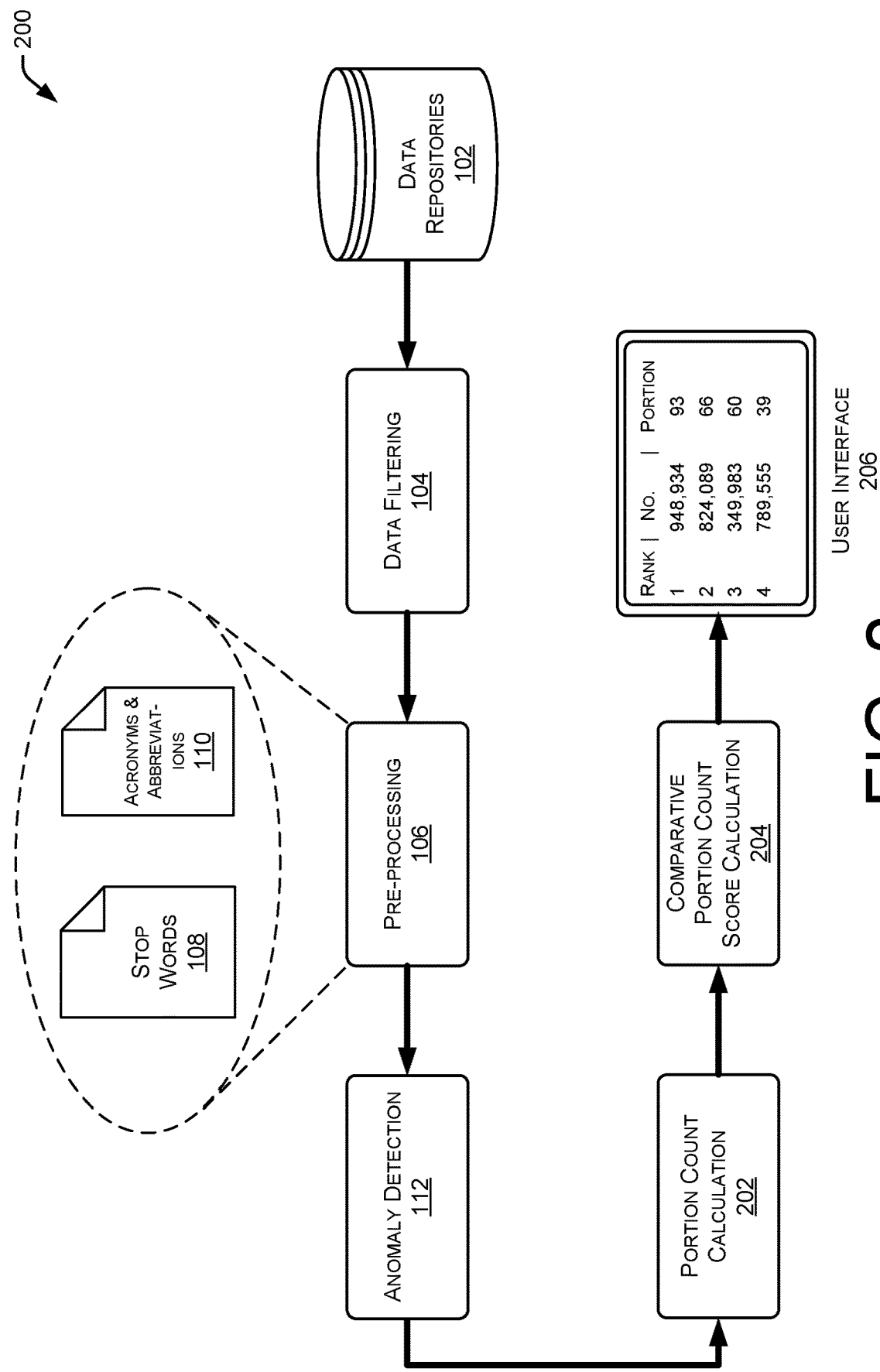
FIG. 2 illustrates an example processing pipeline for generating a user interface showing results of automatic document analysis that are based on portion counts of respective documents.

FIG. 2 illustrates an example processing pipeline 200 for automatically analyzing and presenting portion count information from multiple documents. The documents may come from one or more data repositories 102. For instance, the documents may include the same documents that were analyzed by the processing pipeline 100 from FIG. 1. In some instances, the documents may further be filtered and/or pre-processed using similar techniques as the documents of FIG. 1. For instance, data filtering 104 can limit the data obtained from the data repositories 102 to a corpus of documents that share specified characteristics. Pre-processing 106 can modify the documents or portions of the documents for later processing based on stripping out punctuation, removing stop words 108, converting acronyms and abbreviations 110 to full words, stemming, and/or removing duplicate words. Additionally, anomaly detection 112 identifies portions of documents that likely include an anomaly which will result in the portion of the document being excluded from further analysis or being flagged to alert a human user that there may be reasons to manually review the flagged document portion.

Portion count calculation 202 can determine a value (e.g., overall portion count score) corresponding to the number of portions that are within each of the documents. For instance, after performing the filtering and/or the pre-processing of a document, the portion count calculation 202 can determine a value corresponding to the number of document portions that were identified for the document. In some instance, the value corresponds to each of the document portions that were analyzed by the processing pipeline 100 of FIG. 1. In some instances, when a document includes a patent, the value corresponding to the number of portions can include the number of claims within the patent. For instance, value can indicate the number of independent claims and/or dependent claims within the patent. For example, if the patent includes three independent claims and seventeen dependent claims, the value for the document can include twenty.

In some instances, the portion count calculation 202 can weight one or more of the document portions when determining the value for a document. For instance, if the document includes a patent, more weight can be provided to the independent claims than to the dependent claims when determining the value for the patent. For example, for the patent above that includes three independent claims and seventeen dependent claims, the value for the document may include twenty-nine if the independent claims are given four times more weight than the dependent claims (e.g., (3*4)+17=29). Of course the weight of independent claims may be something other than four times, such as 1.1×, 1.2×, 1.3×, 2×, 3×, 5×, etc. In some instances, weighting independent claims greater than dependent claims for patents can provide a better prediction for the quality of the patents since patents that include more independent claims may include a broader claim scope than other patents or more reflect a different strategy of the claim drafter.

Comparative portion count score calculation 204 can determine comparative portion count scores for the documents based on the values determined for other documents being analyzed. For instance, to determine a comparative portion count score for a given document, the comparative portion count score calculation 204 can compare the value associated with the given document to the values of the other documents being analyzed. In some instances, the comparative portion count score for a document corresponds to the percentage of documents that include a value that is equal to or less than the value of the document. In some instances, the comparative portion count score for a document corresponds to the percentage of documents that include a value that is less than the value of the document. In some instances, the comparative portion count score for a document corresponds to the percentage of documents that include a value that is equal to or greater than the value of the document. Still, in some instances, the comparative portion count score for a document corresponds to the percentage of documents that include a value that is greater than the value of the document.

The UI 206 may display, or otherwise present to a user, the comparative portion count scores, rankings based on the comparative portion count scores, and an identifier for each of the analyzed documents. As discussed above, the identifier for each of the documents may be a unique identifier such as a patent number, a published patent application number, an international standard book number (ISBN), a title, a universal resource identifier (URI), etc. The UI 206 may be generated by processing a text file or other textual output. The UI 206 may be implemented as a command line interface, as a graphical user interface, or as another type of interface. When implemented as a graphical user interface, the UI 206 may be generated by a cloud service that is accessible over a communications network such as the Internet. Cloud services do not require end user knowledge of the physical location or configuration of the system that delivers the services. Common names associated with cloud services include "software as a service" or "SaaS", "platform computer", "on-dash demand computing," and so on. Any number of users may access the UI 206 any time through specialized applications or through browsers (e.g., Internet Explorer®, Firefox®, Safari®, Google Chrome®, etc.) resident on their local computing devices.

Figure 3:
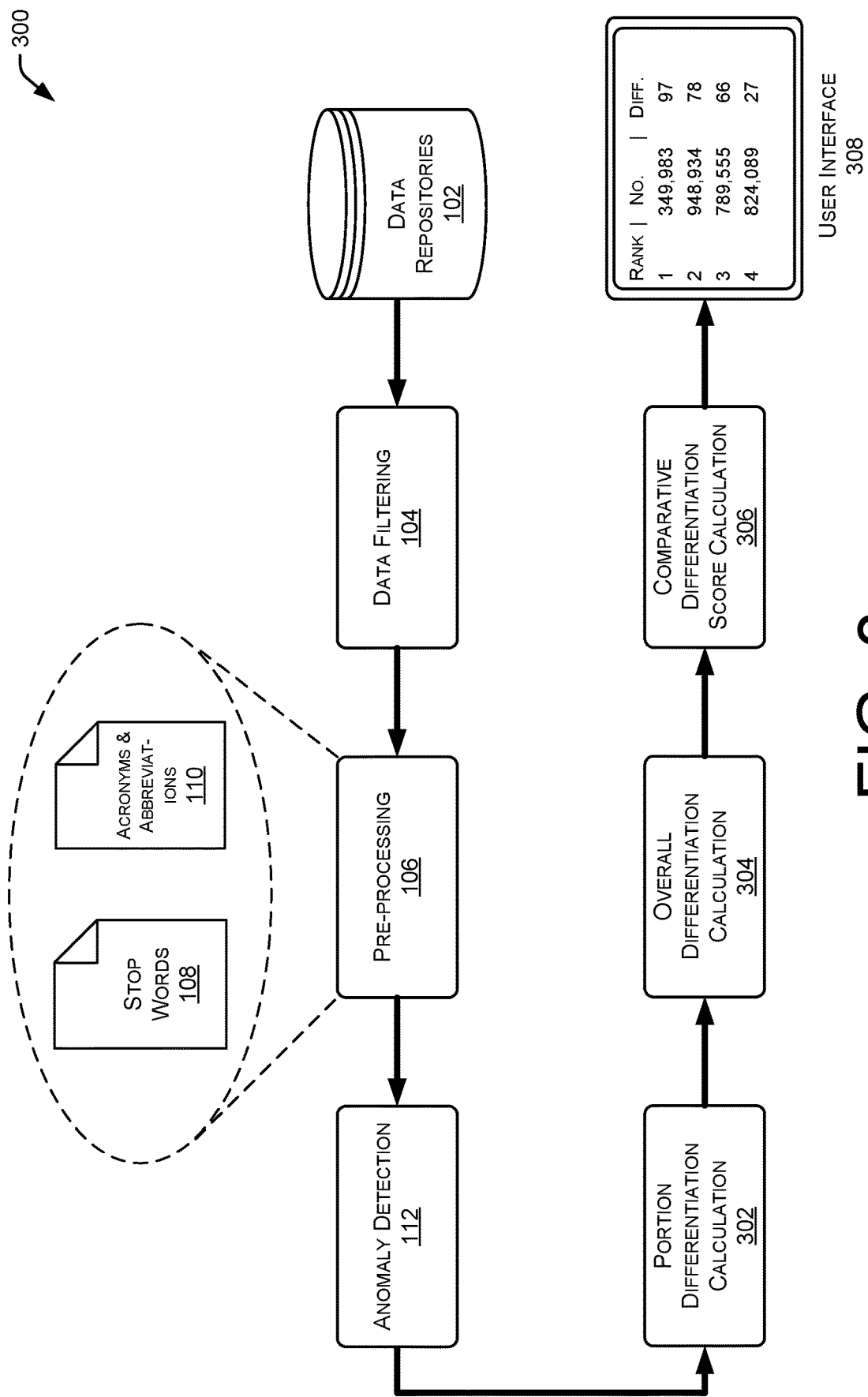
FIG. 3 illustrates an example processing pipeline for generating a user interface showing results of automatic document analysis that are based on differentiation of respective documents.

FIG. 3 illustrates an example processing pipeline 300 for automatically analyzing and presenting differentiation information from multiple documents. The documents may come from one or more data repositories 102. For instance, the documents may include the same documents that were analyzed by the processing pipeline 100 from FIG. 1 and/or the processing pipeline 200 of FIG. 2. In some instances, the documents may be filtered and/or pre-processed using similar techniques as the documents of FIG. 1. For instance, data filtering 104 can limit the data obtained from the data repositories 102 to a corpus of documents that share specified characteristics. Pre-processing 106 can modify the documents or portions of the documents for later processing based on stripping out punctuation, removing stop words 108, converting acronyms and abbreviations 110 to full words, stemming, and/or removing duplicate words. Additionally, anomaly detection 112 identifies portions of documents that likely include an anomaly which will result in the portion of the document being excluded from further analysis or being flagged to alert a human user that there may be reasons to manually review the flagged document portion.

Differentiation calculation 302 can determine differentiation between document portions within each of the documents being analyzed. Differentiation is a subjective concept that is represented in a form amenable for automatic analysis by considering at least word count and differentiation between words of various document portions within a document. Similar to the breadth analysis discussed above, words may be counted based on the raw input following data filtering 104 or after some level of pre-processing 106. For example, word count may be performed after removal of duplicate words so that it is a word count of unique words. Also, word count may be performed before or after removing stop words 108. Similarly, word count may be performed before or after converting acronyms and abbreviations 110 into their full word representations.

Differentiation of words represents a number of words within a document portion of a document that are not found within one or more other document portions of the document. For example, if a document portion includes the words "audio", "data", "representing", "voice", and "input", and at least one other document portion includes the words "audio" and "data", the word count for the document portion includes five words and the differentiation of words for the document portion includes three. The differentiation calculation 302 combines both word count and differentiation to assign a differentiation score to a document portion. For examples, a differentiation score for the example above may include sixty percent (e.g., three unique words/five total words). Specific techniques for determining word count, word differentiation, and differentiation score are discussed below. In some instances, some documents may have multiple portions that are scored. For example, an abstract and an executive summary of a financial document could be scored. For another example, a single patent document may include independent and dependent claims, and each of one or more independent claims and/or each of one or more dependent claims may be assigned a different differentiation score.

For documents that include patents and/or published applications, there may be multiple types of differentiation between claims (e.g., the document portions) within the patents and/or published applications that can be analyzed using the word count/differentiation score technique above. A first type of differentiation between two claims can include a first claim and a second claim that include similar claim components, where each claim uses different wording. A second type of differentiation between two claims can include a first claim and a second claim that include similar components, but claimed in a different order. Still, a third type of differentiation between two claims can include a first claim and a second claim that are claiming different components.

In some instances, the differentiation calculation 302 may determine that the first type and the second type include less differentiation than the third type. For example, and for the first type, the differentiation calculation 302 may determine that there is not a differentiation between two different words that includes a similar meaning. For instance, the differentiation calculation 302 can determine that there is no word differentiation between a first claim that recites "an audio signal representing sound" and a second claim that recites "sound represented by an audio signal." In some instances, natural language processing techniques may be used to determine whether two words include a similar or a different meaning. For a second example, and for the second type, the differentiation calculation 302 may determine that there is no word differentiation between a first claim and a second claim when components include similar words (e.g., no differentiation) that are merely organized differently. For a third example, and for the third type, the differentiation calculation 302 can determine that there is word differentiation between a first claim and a second claim that recite different components. For instance, the differentiation calculation 302 can determine that there is a word differentiation between a first claim that recites "a camera to capture an image" and a second claim that recites "a scanner to scan an image" (e.g., the word "camera" differs from "scanner" and the word "capture" differs from "scan").

For example, a first claim in a patent may recite, "capturing a first image of an environment using a camera;

analyzing the first image; and capturing a second image of the environment using the camera," a second claim in the patent may recite, "using a camera to capture a first image of an environment; using a camera to capture a second image of the environment; and analyzing the first image," and a third claim of the patent may recite, "obtaining a first depth map of an environment using a sensor; analyzing the first depth map; and obtaining a second depth map of the environment using the sensor." The differentiation calculation 302 may then analyze the patent to determine a differentiation score between the first claim and the second claim, between the first claim and the third claim, and between the second claim and the third claim.

For instance, the patent may be may be pre-processed using 104-112 above (e.g., removing stop words, stemming, and removal of duplicate words). Based on the pre-processing, the words remaining for analysis for the first claim may include "capturing", "first", "image", "environment", "camera", "second", "using", and "analyzing", the words remaining in the second claim may include "using", "camera", "capture", "first", "image", "environment", "second", and "analyzing", and the words remaining in the third claim may include "obtaining", "first", "depth", "map", "environment", "using", "sensor", "second", and "analyzing". The differentiation calculation 302 can then determine that the second claim includes eight words, none of which are unique when compared to the first claim. As such, the differentiation calculation 302 can determine that the second claim includes a differentiation score of 0% as compared to the first claim. Additionally, the differentiation calculation 302 can determine that the third claim includes nine, words, four of which are unique when compared to the first claim. As such, the differentiation calculation 302 can determine that the third claim includes differentiation score of 44.4%.

As shown above, the differentiation calculation 302 determines that there is a greater differentiation between the first claim and the third claim than between the first claim and the second claim. This is because the first claim and the second claim fall within the first type of differentiation and the second type of differentiation. For instance, the first claim and the second claim include similar features, but with different wording (e.g., "capturing" in claim 1 and "capture" in claim 2), where the features are recited in each claim using a different order. Additionally, the first claim and the third claim fall within the third type of differentiation. For instance, the first claim and the third claim each include unique features.

Overall differentiation calculation 304 determines overall differentiation scores for the documents being analyzed. In some instances, the overall differentiation score for a document may be determined based on the differentiation scores of each of the document portions included within the document. For example, the overall differentiation score for a document may include the average and/or the median of the differentiation scores of each of the document portions included in the document. For another example, the overall differentiation score for a document may include the highest differentiation score, the lowest differentiation score, or a differentiation score between the highest and lowest differentiation scores for each of the document portions included within the document.

Additionally or alternatively, in some instances, the overall differentiation score for a document may be based on a portion of the differentiation scores for each of the document portions included within the document. For example, and based on a document including a patent, the overall differentiation score may include an average and/or median of the differentiation scores for the broadest independent claim (e.g., using the breadth scores above) and each of the dependent claims that dependent from the broadest independent claim. For another example, and based on a document including a patent, the overall differentiation score may include an average and/or median of the differentiation scores of each of the independent claims.

Although the above calculations 302 and 304 describe determining differentiation between one or more portions and final differentiation scores based on word analysis within the document itself, in some instances, these calculations 302 and 304 may determine differentiation between one or more portions and final differentiation scores based on the differentiation "footprint" of the one or more portions relative to an entirety of the subject matter of the corpus of documents. For instance, the calculation 302 can generate a corpus of words based on words within the corpus of documents. In some instances, the calculation 302 can generate the corpus of words using every word that is included in the corpus of documents. In some instances, the calculation 302 can generate the corpus of words using every word that is included in the document portions that are being analyzed. For instance, if the corpus of documents includes a corpus of patents, the calculation 302 can generate the corpus of words to include every word that is included within every claim of the corpus of patents. In some instances, the corpus of words may be generated based on the raw input following data filtering 104 or after some level of pre-processing 106. For example, generating the corpus of words may be performed after removal of duplicate words so that each word in the corpus of words is unique. Also, generating the corpus of words may be performed before or after removing stop words 108. Similarly, generating the corpus of words may be performed before or after converting acronyms and abbreviations 110 into their full word representations.

Using the corpus of words, the calculation 302 may assign a portion differentiation score to a one or more document portions by comparing words within the one or more document portions. In some instances, the calculation 302 may determine the number of unique words in the portion determined to have the broadest overall breadth score. For each additional document portion, the calculation 302 may determine the number of unique words in the portion that are not included in the portion having the broadest overall breadth score. In another example, the calculation may determine the number of unique words that are included in that particular portion and not included in any other portion. In some instances, the number of unique words associated with each portion is then expressed as a percentage of the unique words within the corpus of words in the relevant documents. For example, if the corpus of words in the relevant documents includes 10,000 unique words, and a given document portion (e.g., independent claim) includes 20 unique words that are within the corpus of 10,000 unique words, then the percentage for the given document portion is 0.002%. If a second document portion (e.g., independent claim) also includes 20 unique words that are both within the corpus of 10,000 unique words and exclusive of the words in the first (or any other previously processed) document portion, then the percentage for the second document portion is also 0.002%.

If the document of interest includes only those two portions, in some instances the overall differentiation calculation at 304 could made by summing the reciprocal of each percentage for a differentiation calculation of 1000 (1/0.002+1/0.002), giving more weight to portions with a relatively small percentage of the unique words of the corpus. In other instances, the reciprocal of one minus the percentage could be summed for each portion (i.e., 1/(1−0.002)+1/(1−0.002)=2.004), giving more weight to portions with a relatively large percentage of the unique words of the corpus. In other instances, the reciprocal of the percentage for the broadest portion could be used and the reciprocal of one minus the percentage could be used for all other portions. In still other instances, the summation could be made after further weighting to the contribution of individual portions (e.g., in the context of patent documents, weighting the contribution of independent claims more heavily than the contribution of dependent claims). In this manner, a document with many document portions having unique words that are not common to other portion within the document will have a relatively high overall differentiation score and large "footprint."

Comparative differentiation score calculation 306 can determine comparative differentiation scores for the documents as compared to other documents within the analysis. For instance, to determine a comparative differentiation score for a document as compared to other documents in the analysis, the comparative differentiation score calculation 306 compares the overall differentiation score of the document to the overall differentiation scores of other documents that are within the analysis. In some instance, the comparative differentiation score for a document corresponds to the percentage of documents that include an overall differentiation score that is equal to or less than the overall differentiation score of the document. In some instance, the comparative differentiation score for a document corresponds to the percentage of documents that include an overall differentiation score that is less than the overall differentiation score of the document. In some instance, the comparative differentiation score for a document corresponds to the percentage of documents that include an overall differentiation score that is equal to or greater than the overall differentiation score of the document. Still, in some instance, the comparative differentiation score for a document corresponds to the percentage of documents that include an overall differentiation score that is greater than the overall differentiation score of the document.

The UI 308 may display, or otherwise present to a user, the comparative differentiation scores for the documents, rankings based on the comparative differentiation scores, and an identifier for each of the analyzed documents. The identifier for each of the documents may be a unique identifier such as a patent number, a published patent application number, an international standard book number (ISBN), a title, a universal resource identifier (URI), etc. The UI 308 may be generated by processing a text file or other textual output. The UI 308 may be implemented as a command line interface, as a graphical user interface, or as another type of interface. When implemented as a graphical user interface, the UI 308 may be generated by a cloud service that is accessible over a communications network such as the Internet. Cloud services do not require end user knowledge of the physical location or configuration of the system that delivers the services. Common names associated with cloud services include "software as a service" or "SaaS", "platform computer", "on-dash demand computing," and so on. Any number of users may access the UI 308 any time through specialized applications or through browsers (e.g., Internet Explorer®, Firefox®, Safari®, Google Chrome®, etc.) resident on their local computing devices.

Explorer®, Firefox®, Safari®, Google Chrome®, etc.) resident on their local computing devices.

Figure 4:
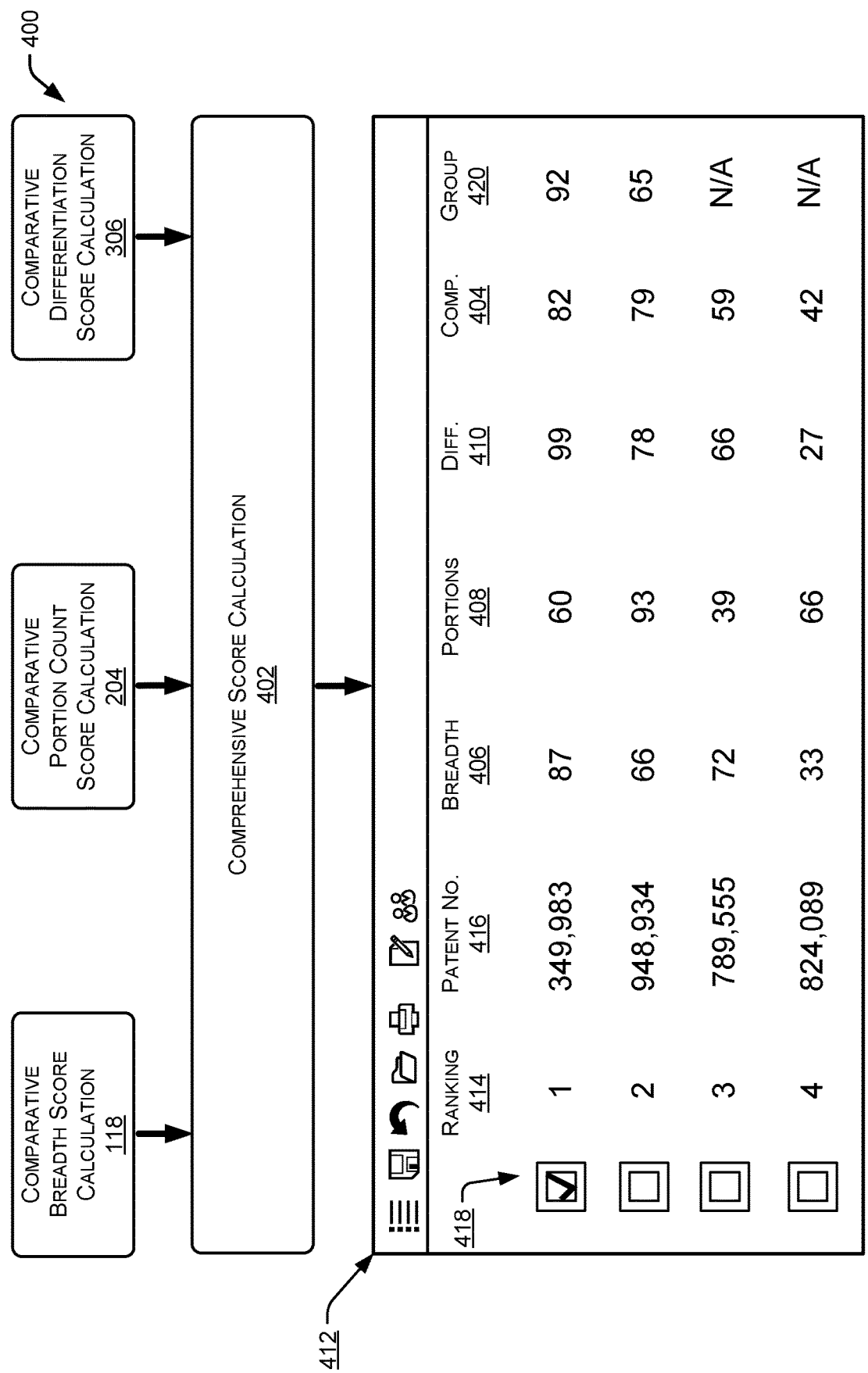
FIG. 4 illustrates an example processing pipeline for generating a user interface showing overall results of automatic document analysis.

FIG. 4 illustrates an example processing pipeline 400 for generating a user interface showing final results of automatic document analysis. As shown, comprehensive score calculation 402 can receive the scores from each of the processing pipelines 100, 200, and 300, and then use the scores to determine comprehensive scores for each of the documents under analysis. In some instances, the comprehensive score calculation 402 determines the comprehensive score for each of the documents by taking an average of the three scores for the respective documents. For example, and as shown for patent 349,983, the comprehensive score 404 includes an average of the comparative breadth score 406 (from processing pipeline 100), the comparative portion count score 408 (from processing pipeline 200), and the comparative differentiation score 410 (from processing pipeline 300) for the patent. In some instances, the comprehensive score calculation 402 may weight one or more of the three scores when determining the comprehensive scores for each of the documents. For example, if the comprehensive score calculation 402 gives twice as much weight to the comparative breadth scores 406 than each of the comparative portion scores 408 and the comparative differentiation scores 410, the comprehensive score for patent 349, 983 would have the value 83.25 (e.g., ((87*2)+60+90)/4=83.25).

FIG. 4 further shows one implementation of a UI 412 that can provide final results of an analysis to a user. The UI 412 may display information generated by each of the processing pipelines 100, 220, 300 for a number of different documents or document portions. In this example, the documents are issued patents and the analyzed portions are claims within the patents. However, the same or similar UI could display analysis of different types of documents. One illustrative type of UI is as graphical user interface (GUI) as shown in FIG. 4. A GUI is a type of user interface that allows users to interact with electronic devices through graphical icons and visual indicators such as secondary notation, instead of text-based user interfaces, typed command labels or text navigation. Actions in the GUI may be performed through direct manipulation of the graphical elements using a pointing device such as a mouse, stylus, or finger.

There is an entry for one or more documents in the UI 412 and information about those documents. The information may include the ranking 414 for each of the documents, patent number 416 for each of the documents, the comparative breadth scores 406 for each of the documents, the comparative portion count scores 408 for each of the documents, the comparative differentiation scores 410 for each of the documents, and the comprehensive scores 404 for each of the documents. The UI 412 may also include interactive elements 418 associated with each of the entries. One of the interactive elements 418 may be activated in response to a command generated on an input device to select a one of the documents. Information about the analysis of the selected document may be saved to a separate file, placed in separate portion of memory, or added to a list for later access and/or analysis.

Furthermore, in some instances, the UI 412 can include group scores 420 for the documents under analysis. For instance, a document may be related to one or more other documents that are being analyzed. For example, a patent may be included in a patent family, which can include two or more patents. Thus, the group scores 420 can include a score for each of the documents that is included in a group. In some instances, the group score 420 for a document can include the average of each of the comprehensive scores of the documents within the group. In some instances, the group score 420 for a document can include the median, mode, lowest comprehensive score, highest comprehensive score, or the like of the comprehensive scores of the documents within the group. In some instances, one or more of the documents under analysis may not be included in a group and as such, may not include a group score 420. For instance, the first two patents included in the UI 412 include respective group scores 420, while the last two patents do not include respective group scores 420.

It should be noted that, in some instances, rather than using the results from the comparative breadth score calculation 118, the comparative portion count score calculation 204, and the comparative differentiation score calculation 306, the comprehensive score calculation 402 can additionally, or alternatively, use one or more of the results from the overall breadth calculation 116, overall portion count calculation 202, and the overall differentiation calculation 304 to calculate the comprehensive scores for the documents. For instance, in some examples, the comprehensive score calculation 402 may not normalize the overall scores for the documents when determining the comprehensive scores for the documents. Additionally, in some instances, the comprehensive scores may be based on only one or two of the comparative breadth score calculation 118, the comparative portion count score calculation 204, and the comparative differentiation score calculation 306.

Illustrative Methods

The methods are illustrated as a collection of blocks in a logical flow graph representing a sequence of operations that can be implemented in hardware, software, firmware, or a combination thereof. The order in which the method blocks are described and claimed is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Methods 500-1000 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

Figure 5:
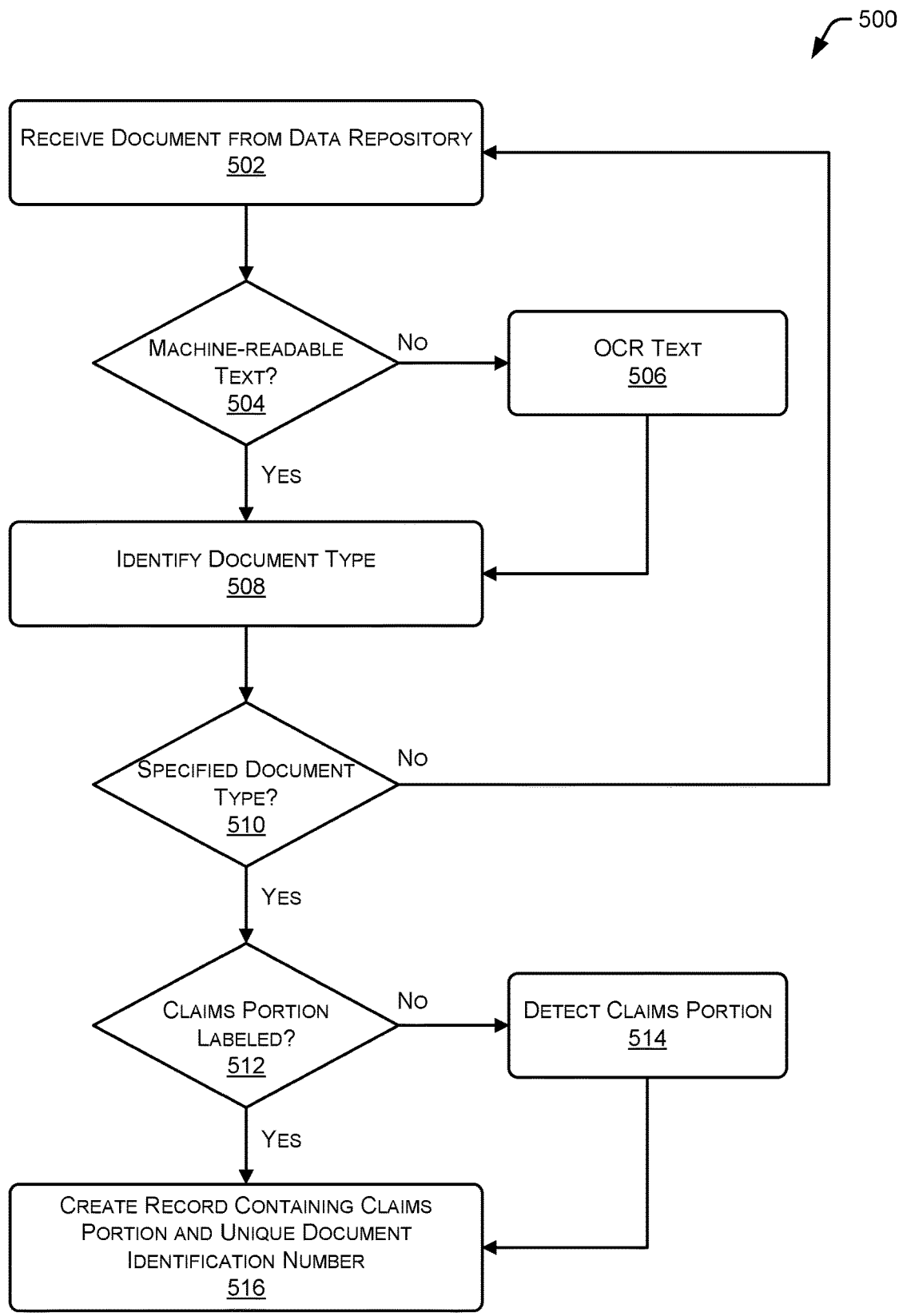
FIG. 5 is a flowchart illustrating an example method for filtering documents from a data repository to identify and prepare portions of those documents for analysis.

FIG. 5 is a flowchart depicting an example method 500 of filtering data that comes from one or more data repositories. For instance, a collection of patents and/or applications may be gathered from a data repository limited to a technology area. This allows the words and/or phrases to share a common ontology, vocabulary and/or taxonomy. In some instances, the collection may be obtained based on classification codes, such as the U.S. Patent and Trademark Office (USPTO) classes and subclasses, or the International Patent Codes (IPC).

At 502, a single document may be received from a data repository for analysis. Each document in the data repository may be associated with a unique document identification number. The unique document identification number of a patent document may include an application number, a publication number, a patent number, and/or a combination of information associated with the patent document that may uniquely identify the patent document (such as a combination of a name of an inventor and a filing date, etc.).

This process may repeat until all documents in a targeted data repository are analyzed. The available data repositories may include, but are not limited to, a patent database provided and/or supported by a patent office of a particular country (e.g., a USPTO (United States Patent and Trademark Office) database, a PAIR (Patent Application Information Retrieval) database, EPO (European Patent Office) database, WIPO (World Intellectual Property Organization) database, SIPO (State Intellectual Property Office of the P.R.C.) database, etc.), and any other databases that are provided by public and/or private institutions over the world.

At 504, it is determined if the document contains machine-readable text. Some types of files available from the data repositories, such as HTML documents, may already contain machine-readable text. Other types of files such as PDF files representing images of paper documents may lack machine-readable text. Draft documents or unpublished documents, for example, may be available only in forms that do not include machine-readable text. The determination of whether a document contains machine-readable text may be made in part by automatic detection of file type using known techniques for file type identification including recognition of filename suffixes. If a file type is not specified by a suffix or other metadata, it may be determined by opening the file and comparing the file structure to a library of known structures associated with known file types. If a document is determined to not include machine-readable text, method 500 may proceed to 506 and optical character recognition (OCR) may be used to recognize text in the document.

At 506, OCR may be applied to the document to convert the document into a format that contains machine-readable text. OCR is the mechanical or electronic conversion of images of typed, handwritten, or printed text into machine-encoded text, whether from a scanned document, a photo of a document, or other source. OCR is a method of digitizing from imaged texts so that they can be electronically edited, searched, stored more compactly, displayed on-line, and used in machine processes such as cognitive computing, machine translation, (extracted) text-to-speech, key data and text mining. OCR involves pattern recognition, artificial intelligence, and computer vision.

At 508, document type is identified. Document type means the type of information contained in a document rather than the computer file format in which the document is encoded. Documents may include identifying information such as unique document identification numbers, kind codes, and indications of source. Unique document identification numbers may, for example, include patent numbers that can be used to distinguish between different types of patents based on the structure of the number. For example when analyzing document identification numbers coming from a database of U.S. patents, a seven digit number may be interpreted as indicating that the document is a utility patent, and eleven digit number optionally with a "/" following the first four digits may indicate a published patent application, a five or six digit number preceded by the letter D indicates a design patent, and identifiers for plant patents begin with the letters PP. Kind codes in patent documents can also indicate if a document is a utility patent, plant patent, patent application publication, statutory invention registration, or design patent. The documents to be analyzed may come from any one of a number of different data repositories. If a given data repository is known to be limited to containing only documents of a certain type, then all documents obtained from that data repository may be assumed to be of the specified type. For example, a document obtained from a data repository that only contains academic papers on biotechnology may be identified as an academic paper on biotechnology by virtue of coming from this specific data repository. Each document at this point in method 500, will contain machine-readable text and be associated with a document type.

At 510, it is determined if the document is of one or more specified document types. This filters documents based on document type. Document type(s) may be specified by user. In the absence of user specification, filtering may be performed based on a default document type. In one implementation, the default document type may be issued U.S. patents. Thus, any document that is identified as a U.S. patent either by a unique document identification number, a kind code, by coming from a particular data repository, or other technique is retained for further analysis. A user may also specify both issued U.S. patents and issued European patents in which case documents of either type would be determined to match the specified document type. However, if a document does not match the specified document type, method 500 returns to 502 and a new document is received from the data repository. This portion of method 500 may proceed automatically and continually until all documents within the one or more data repositories have been analyzed. This processing and filtering allows use of varied data repositories and allows for document analysis to be applied across multiple data repositories because there are mechanisms for converting all documents into machine-readable text and for excluding documents that do not match a specified document type.

For those documents that do match the specified document type at 510, method 500 proceeds to 512.

At 512, it is determined if the claims portion of the document is labeled. A labeled claims portion is identified as a portion of text that contains patent claims separate from other portions of a patent document. For example, a document in CSV format may have all the claims in the same column which is designated as containing claims. Alternatively, an HTML document may have specific tags on each claim indicating that is a claim and whether it is an independent or dependent claim. However, other documents such as an OCR version of a PDF document may simply contain undifferentiated text. For such documents, claims cannot be identified as such without additional analysis. This example discusses determining if a claims portion of a patent document is labeled. However, identifying specific label portions of a document is not limited to this application and may also be applied to determine of other portions of documents are separately identified such as determining which financial documents have executive summaries labeled as executive summaries.

If a document does not have a labeled claims portion, method 500 proceeds to 514.

At 514, the claims portion is detected. The specific technique for detecting the claims portion may vary based on the document format. In one implementation, keyword recognition may be used to distinguish a claims portion. For example, if a page of a document includes the word "claim" or "claims" within the first line and is followed on that same page by a paragraph beginning with a number followed by a period, then that paragraph or entire page may be designated as a claims portion. Other recognition techniques may be alternatively or additionally applied. For example, any paragraph including a line ending with a semicolon may be interpreted as a claim.

At 516, a record is created from the document containing the claims portion and unique document identification number. This record may be stored as an independent file or as a portion of another file. The record may be in a different format than the format of the source document. In many implementations, the record will be stored in a memory that is both logically and physically separate from any of the data repositories. This record can be associated with the source document through the unique document identification number. The claims in the record may be distinguished as individual claims or may be an undifferentiated collection of text that represents some or all of the claims in the patent document. Thus, in the context of patent documents this record may represent the claims section of a patent document. Generation of multiple records from multiple documents can create a corpus of patent claims that are amenable for further analysis.

Figure 6:
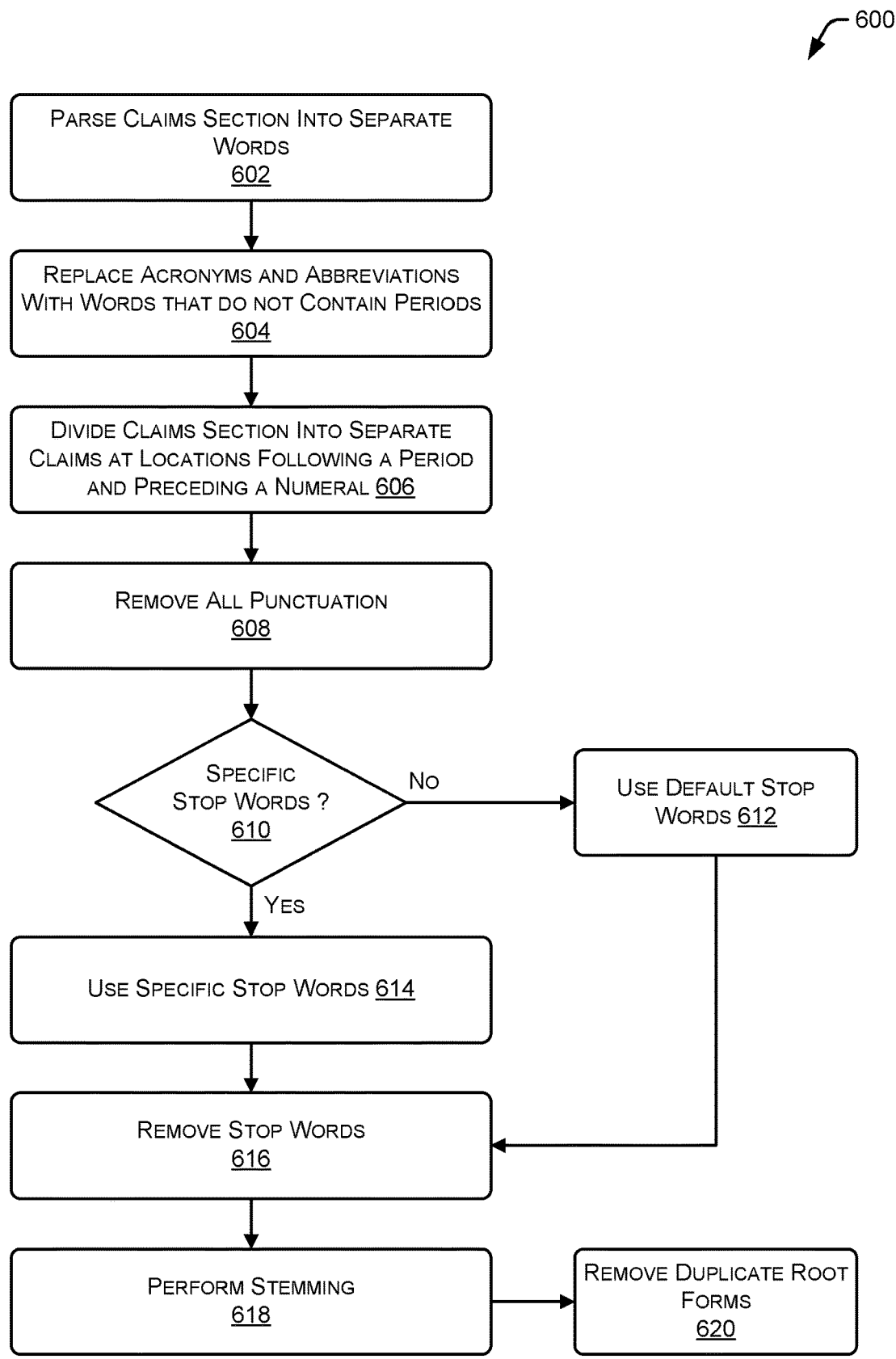
FIG. 6 is a flowchart illustrating an example method for pre-processing a portion of a document.

FIG. 6 is a flowchart depicting an example method 600 of pre-processing claims prior to an analysis of claim breadth. The pre-processing serves to normalize the content of the claims so that determination of claim breadth, portions count, and differentiation provides more consistent results. It also provides a way to customize part of the document analysis without modifying the techniques for determining claim scope.

At 602, the claims section of a document may be parsed into separate words. This divides the text of the claims section into multiple discrete words. Word parsing may be performed by identifying word delimiters and using the word delimiters to separate the text into individual words. A delimiter is a blank space, comma, or other character or symbol that indicates the beginning or end of a character string, word, or data item. In one implementation, the word delimiters are both a <space> and dash "-". Word parsing may be performed before after individual claims are distinguish from one another.

At 604, acronyms and abbreviations are replaced with alternative standardized representations. This may be performed by comparing each word from the claim section to a synonym library (e.g., a lookup table) containing known acronyms and abbreviations that are paired with alternative representations. In some instances, the alternative representations may be fully written out words. Alternative representation may also be a standardized form that does not use periods. For example, "NASA" may be replaced with National Air and Space Administration. Similarly, "U.S.A." may be replaced by "USA" or in some implementations "United States of America." This serves to remove the periods that are found in some abbreviations and to normalize word count so that claims are not perceived as shorter merely because they use more acronyms or abbreviations. Removing periods in acronyms allows for use of the end of sentence period to be an indicator of where a first claim and a second claim begins.

At 606, the claims section maybe to be divided into individual claims. Recall that after document filtering, each record of a document may include a claim section that could potentially contain multiple claims which are not separately differentiated from each other. Although it may be relatively trivial for a human to identify different claims in a document, it can be much more difficult for an automated process to accurately parse strings of text into separate claims. With patent claims, however, this may be done by creating separation between a first claim and a second claim whenever there is a period followed by a numeral. The separation may be implemented by inserting a carriage return, line break, or other marker. This is a reasonable approximation for dividing claims because once the abbreviations with periods have been replaced with full words, the only periods present in a set of claims will be at the end of a claim. Furthermore, each claim will start with a numeral (e.g., 1-20). Therefore, any point following a period and preceding a numeral is likely a division between two claims.

At 608, once the claims have been divided into separate claims, all punctuation may be removed. Punctuation may be removed by matching against a list of punctuation and deleting any character found in the list. Removing punctuation may remove any or all of periods, semicolons, commas, hyphens, brackets, slashes, and the like. Punctuation is generally understood to not affect claim breadth. Thus, by removing punctuation, characters that will not be processed further are taken out of the text which is to be analyzed.

At 610, it is determined if there are specific stop words. Specific stop words may be based on the content of the documents being analyzed. For example, if the documents are patent documents, then the specific stop words may include words that are common in patent claims and unlikely to serve to distinguish one claim from another. A patent-specific list of stop words may include words and/or phrases such as "computer readable media," "system," "machine," "comprising," and "wherein," as well as words and/or phrases that indicate statutory classes such as "method," "article of manufacture", and "composition of matter." Technology specific stop words may also be used. For example, if all the patent documents being analyzed are from a same technological class or grouping, then stop words previously identified for that technology may be used. For example, "circuit" may be included in a stop list that is specific for documents describing electrical engineering.

If specific stop words are not available, then method 600 proceeds to 612 and uses default stop words. If, however, specific stop words are available, then method 600 proceeds to 614 and uses the specific stop words. Multiple sets of stop words may be used together. For example one or more specific stop word lists may be used in conjunction with a default stop word list.

At 616, stop words are removed. If multiple stop word lists are used together, then words are removed if they appear in any of the stop word lists.

At 618, stemming is performed on the remaining words. Stemming is the process of reducing inflected (or sometimes derived) words to their word stem, base or root form— generally a written word form. The stem need not be identical to the morphological root of the word; it is usually sufficient that related words map to the same stem, even if this stem is not in itself a valid root. Stemming is an additional form of normalization that removes differences between similar words such as "compare" and "comparing." There are numerous known techniques for stemming including use of a lookup table, suffix stripping, Lemmatisation, stochastic algorithms, n-gram analysis, matching algorithms, etc. In one implementation, the Porter Stemmer algorithm from the publicly available "nltk" package is used to perform stemming.

At 620, duplicate words may be removed. When duplicate word removal occurs after stemming, it is actually the duplicate root forms of the words that are removed. For example, removable of duplicates prior to stemming would leave both "adapter" and "adapted" in the text of a process claim, but following stemming the words may both be converted to the root form "adapt" and one may be removed.

Thus, the various claim sections obtained from patent documents are standardized through pre-processing by replacing acronyms and abbreviations with alternative representations (e.g., writing out in full words), removing punctuation, removing stop words, stemming, and deletion of duplicate words. This pre-processing makes the data from the data repositories more amenable to automatic analysis of claim breadth. It also strips away some of the variation that may be introduced by various patent claim drafting techniques in an effort to approximate the content of a patent claim separate from a particular writing style. Although a human analyst can identify when writing is "wordy," automatic analysis of breadth may be confounded by different writing styles and potentially score similar claims differently unless pre-processing is performed.

Figure 7:
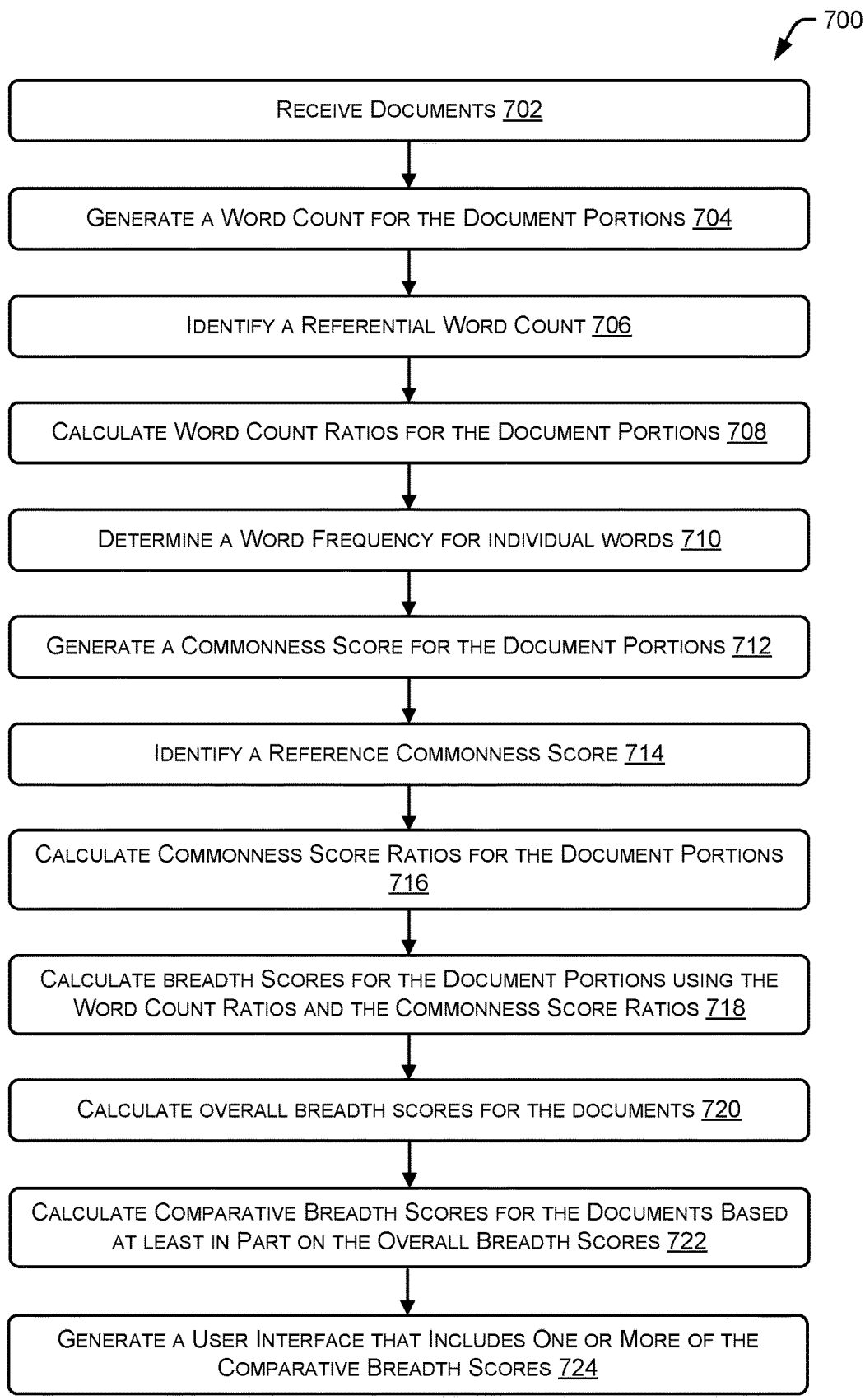
FIG. 7 is a flowchart illustrating an example method for automatic processing of documents to generate a user interface indicating breadth scores.

FIG. 7 is a flowchart depicting an example method 700 of automatically processing documents to generate a UI that illustrates comparative breadth scores for the documents. At 702, documents are received. For instance, the documents may be received from one or more data repositories, such as data repositories 102. In some instances, the documents may contain text either in computer-readable form, or otherwise, and each document may be associated with a unique document identification number. This unique document identification number may be used to label the document as well as any sub-portions of the document. For some documents, specifically patent documents, the unique document identification number may be a patent number or a patent application publication number. In some instances, the documents may be stored locally in a memory device separate from the data repository that provided the documents.

In some instances, the documents are pre-processed to generate one or more processed document portions for each of the documents. The pre-processing may use all or part of the method 500 described in FIG. 5 and/or the method 600 described in FIG. 6. For instance, a processed document may refer to the document following pre-processing. In some instances, the pre-processing itself may divide a document into two or more processed document portions. For example, when analyzing text containing patent claims, the document may be divided into document portions (e.g., individual patent claims) at locations following a period and preceding a numeral. In some instances, each portion of the document is associated with the unique document identification number of the source document. For example, each patent claim from a patent would be associated with the patent number. The processed document portions include a portion of the text from the source document. The specific pre-processing techniques may include parsing text to separate words, removing stop words, removing duplicate words, and removing punctuation. In some instances, some or all of the stop words may be specific to a document classification of the documents. For example, if all of the documents are associated with the same patent classification, and there are specific stop words for that classification, then those specific stop words may be used instead of or in addition to general stop words. In some instances, pre-processing may include additional pre-processing techniques, such as replacing abbreviations and/or acronyms with the corresponding full words.

At 704, a word count is generated for each of the document portions (e.g., processed or unprocessed document portions). For instance, a word count for each document portion may be generated by counting a number of separate words in the respective document portions. In some instances, this may be performed after pre-processing so that stop words and duplicate words are omitted from the count. A word count performed after removal of duplicate words is referred to as a word count of unique words. In some instances, the word count generated for each document portion (e.g., patent claim includes is an integer (e.g., one, two, three, etc.).

At 706, a referential word count is identified. In some instances, the referential word count is a number, but not necessarily an integer. The referential word count may be based on a characteristic derived from the word counts of the individual document portions under analysis. For example, the referential word count may be the word count of the document portion having a largest word count out of all the analyzed document portions. For another example, the referential word count maybe the word count of the document portion having a shortest word count out of all the analyzed document portions.

In some instances, other characteristics may also be used to generate the referential word count such as the average or median word count of the analyzed document portions. For example, if the analyzed document portions are patent claims, then the referential word count may be the word count of the longest patent claim, the word count of the shortest patent claim, the average word count of all the analyzed patent claims, the median word count of all the analyzed patent claims, or some other metric. In some instances, the referential word count is the same for all document portions analyzed together in the same corpus. However, in some instances, due to the different characteristics of each corpus of documents analyzed, the referential word count will be different in different analyses.

At 708, word count ratios are calculated for the document portions. For instance, a word count ratio may be calculated for each document portion by dividing the referential word count by the word count for a respective document portion. Thus, in some instances, each analyzed document portion will be associated with a word count ratio. In some instances, the numerator is the same for each document portion in a given corpus, but the denominator is different depending on the individual word count of that document portion. For example, if the word count for a given document portion is 25 and the referential word count is 72 (e.g., the longest word count of all the analyzed document portions), then the word count ratio for that particular document portion is 72/25 or 2.88.

At 710, a word frequency is determined for individual words. For instance, a corpus-based word frequency may be determined for each word included in any of the document portions. In some instances, the word frequency is specific to the word and not the document portion in which the word is found. Word frequency may be thought of as a measure of how common a particular word is throughout all of the analyzed document portions. In some instances, word frequency is determined by counting how many times a word appears in all of the analyzed document portions. Thus, word frequency represents the number of instances that a word is found across the entire set of content under analysis prior to removal of duplicate words. For example, if the corpus of documents being analyzed includes 1000 patents, those patents each have on average 20 patent claims, then there will be 20,000 document portions under analysis. The number of times a given word such as "machine" appears throughout all 20,000 document portions is that word's frequency. As such, words that are common in a particular corpus will have higher word frequency values and words that are uncommon in the particular corpus will have lower word frequency values. Thus, at this point, each document portion is associated with a word count and each word (which necessarily includes the words in each document portion) is associated with a word frequency.

At 712, a commonness score is generated for the document portions. For instance, each document portion may be associated with its own commonness score. The commonness score is based on the frequency that the individual words in a particular document portion are found throughout the entire corpus of document portions under analysis. Thus, the commonness score for a document portion is based on the word frequencies of the words in that document portion. In some instances, the commonness score for a processed document portion is based on the square root of the sum of the squares of the inverse of the word frequency for each one of the separate words in that processed document portion. For instance, the commonness score (cs) for a document portion having words 1 to n, each with an associated word frequency represented by $wf^1$ to $wf^n$, may be calculated by the following equation:

$$\text{commonness score} = \sqrt{\left(\left(\frac{1}{wf^1}\right)^2 + \left(\frac{1}{wf^2}\right)^2 + \ldots + \left(\frac{1}{wf^n}\right)^2\right) \times 100} \quad (1)$$

With this calculation, a document portion that has more common words will receive a lower commonness score, and a document portion that has more uncommon words will receive a higher commonness score. In this manner, the commonness score represents an underlying assumption or premise that patent claims with more common words tend to be broader than claims with less common words. This may not always be the case, but is a useful generalization for automatic document analysis.

At 714, a reference commonness score is identified. In some instances, the reference commonness score is identified as the highest commonness score out of all of the processed document portions undergoing analysis. The commonness scores for each of the document portions maybe calculated, sorted, and then the highest of those is stored as the highest commonness score. This represents the score of the document portion that is the "most common" based on the frequency and number of words included in that document portion. As such, every other document portion will have a commonness score that is lower than the highest commonness score.

At 716, commonness score ratios are calculated for the processed document portions. For instance, commonness score ratios may be calculated by dividing the reference commonness score (e.g., the highest commonness score) by the commonness score for individual ones of the processed document portions. In some instances, the document portion with the highest commonness score (the "most uncommon" words) has a commonness score ratio of 1 (i.e., it is divided by its own commonness score value). Additionally, a document portion with half the highest commonness score (fewer "uncommon" words and more "common" words) has a commonness score ratio of 2. As the set of words in a document portion become more "common" the commonness score ratio increase. As such, a higher commonness score ratio indicates more "common" or frequent words in a processed document portion. In the context of patent claims, commonness ratio represents an underlying assumption or premise that claims with fewer unique words tend to be broader than claims with more unique words, and thus, the commonness score ratio increases as the words in claim become more common.

At 718, breadth scores for the document portions are calculated using the word count ratios and the commonness score ratios. For instance, the breadth scores may be calculated by taking a square root of the sum of the square of the word count ratio (wcr) and the square of the commonness score ratio (csr) for the individual ones of the processed document portions. In some instances, the relative weights of the word count ratio and the commonness score may be normalized. One technique for normalization is to set the highest respective values for both word count ratio and commonness score ratio to 100. If, for example, the highest word count ratio is h-wcr, then all of the wcr for the corpus will be multiplied by 100/h-wcr. Similar, in some instances, normalization may be performed for the commonness score ratio using the highest commonness score ratio (h-csr). Of course, normalization values other than 100 may be used, such as 1000, 500, 50, 10, or the like. Both are numbers, but the relative effect on a breadth score may not directly correspond to the respective numerical values. For example, a word count ratio of 10 may have more or less impact on ultimate breadth than a commonness score ratio of 10. However, without normalization both contribute equally to the breadth score. As such, the word count ratio may be weighted by a first normalization value K (e.g. 100/h-wcr) and the commonness score ratio may be weighted by a second normalization value L (e.g., 100/h-csr). When written in an equation:

$$\text{Breadth Score} = \sqrt{K(wcr^2) + L(csr^2)} \quad (2)$$

Thus, each document portion may be assigned its own breadth score. The breadth scores may be thought of as measuring the breadth of the document portions because the breadth scores are based on measures of word count and word commonness. This technique for determining a breadth score also moderates each of the underlying assumptions or premises behind the word count ratio and the commonness ratio. For example, if a patent claim is relatively shorter, but uses very uncommon terms, a patent practitioner might still consider the claim to be narrow due to the restrictive language in the claim. By defining a breadth score based on these two underlying assumptions, even shorter claims may be ranked not quite as broad if they use terms that are considered limiting or distinctive within a class in which an ontology is well developed.

At 720, overall breadth scores for the documents are calculated. For instance, an overall breadth score may be calculated for each document being analyzed using the breadth scores for the document portions from the respective document. In some examples, calculating the overall breadth score for a document can include taking an average of the breadth score(s) for one or more document portions within the document. In some instances, calculating an overall breadth score for a document can include taking the highest, the lowest, the range, the average, median, mean or the like of the breadth score(s) of the one or more document portions and producing a composite score or preserving them individually. Additionally, in some instances, one or more of the breadth scores for one or more of the document portions for a document may be given more weight than one or more other breadth scores for one or more other document portions. For instance, if a document is a patent, breadth score(s) of independent claims(s) (e.g., the broadest independent claim) of the patent may be given more weight when determining the overall breadth score than breadth score(s) of dependent claim(s) within the patent.

In some instances, when documents include patents and/or published applications, one or more rules may be utilized for calculating the overall breadth scores for the patents and/or published applications. For example, if documents include patents, a rule may specify that only breadth scores associated with the broadest independent claim and any dependent claim that depends from the broadest independent claim are utilized to calculate the overall breadth score for the patents using the techniques above (e.g., average, median, etc.). For example, if documents include patents, a rule may specify that only breadth scores associated with independent claims are utilized to calculate the overall breadth score for the patents using the techniques above (e.g., average, median, etc.).

At 722, comparative breadth scores for the documents are calculated based at least in part on the overall breadth scores. For instance, a comparative breadth score may be calculated for each document being analyzed based on the overall breadth scores of the documents. For example, where the overall breadth score is based on the score of a single document portion (e.g., broadest or narrowest), the calculation 722 compares that score to the score of the corresponding single document portion of other documents that are within the analysis. Where the overall breadth score is based on the score of multiple document portions (e.g., represented as an average; a weighted or unweighted composite of the broadest, average, and range scores; or as individual component scores such as broadest, average, and range), the calculation 722 compares that score or scores to the score or scores of the corresponding multiple document portions of other documents within the analysis. In some instances, the comparative breadth score for a document corresponds to the percentage of documents that include an overall breadth score that is equal to or less than the overall breadth score of the document. In some instances, the comparative breadth score for a document corresponds to the percentage of documents that include an overall breadth score that is less than the overall breadth score of the document. In some instances, the comparative breadth score for a document corresponds to the percentage of documents that include an overall breadth score that is equal to or greater than the overall breadth score of the document. Still, in some instances, the comparative breadth score for a document corresponds to the percentage of documents that include an overall breadth score that is greater than the overall breadth score of the document. Where the overall breadth score is based on the score of multiple document portions and is maintained as individual component scores such as scores associated with the broadest, average, and range of document portions, calculation 722 may compare each of those scores to the corresponding scores of the multiple document portions of other documents within the analysis. For example, in a context where the documents are patents and the portions are claims, calculation 722 may compare the breadth score of the broadest claim in a patent to the breadth score of the broadest claims in all patents within the landscape, providing a rank ordering of the patent by broadest claim. Calculation 722 may further compare the average breadth of the claims in the patent to the average breadth of the claims in each of the patents within the landscape, providing a rank ordering of the patent by average claim breadth. Calculation 722 may further compare the range of breadth of the claims in the patent to the range of breadth of the claims in each of the patents within the landscape, providing a rank ordering of the patent by range of claim breadth. Then, calculation 722 may weight the rank order of each component score equally, to determine the final breadth score. Such an approach is based on an assumption that a relatively broad claim is more likely to encompass potentially infringing products, a relatively high average claim breadth reflects that likelihood across a range of independent and dependent claims, and a relatively high range of breadth reflects at least some claims are more likely to encompass limitations that reduce the viability of potential challenges to claim validity.

At 724, a UI is generated that includes one or more of the comparative breadth scores. For instance, a UI may be generated such that a comparative breadth score for one of the documents is displayed in proximity to the unique document identification number associated with that document. For example, the comparative breadth score for a patent may be displayed next to the patent number. In some instances, the UI may be a textual UI or a command-line interface that displays a line of text including at least the comparative breadth score and the unique document identification number. In some instances, the UI may include information on documents either to highlight a particular document (e.g., one having a highest comparative breadth score out of all the documents in the analyzed corpus), due to limitations of screen real estate such as on mobile devices, to minimize a volume of data transmitted across a network, or for other reasons.

Due to the processing efficiencies obtained by using automatic computer-based analysis, in some instances, the generating of word counts at 704, the identifying referential word counts at 706, the calculating of word count ratios at 708, the determining of word frequencies at 710, the generating of commonness scores at 712, the identifying the reference commonness score at 714, the calculating of commonness score ratios at 716, the calculating the breadth scores at 718, the calculating the overall breadth scores at 720, and the calculating the comparative breadth scores are 722 are performed at a rate much faster than can be achieved through human analysis. For example, this analysis may proceed at a rate of more than one document per minute, more than one document per 30 seconds, more than one document per 10 seconds, or another rate. This is a rate much faster than can be achieved by manual, human analysis.

Figure 8:
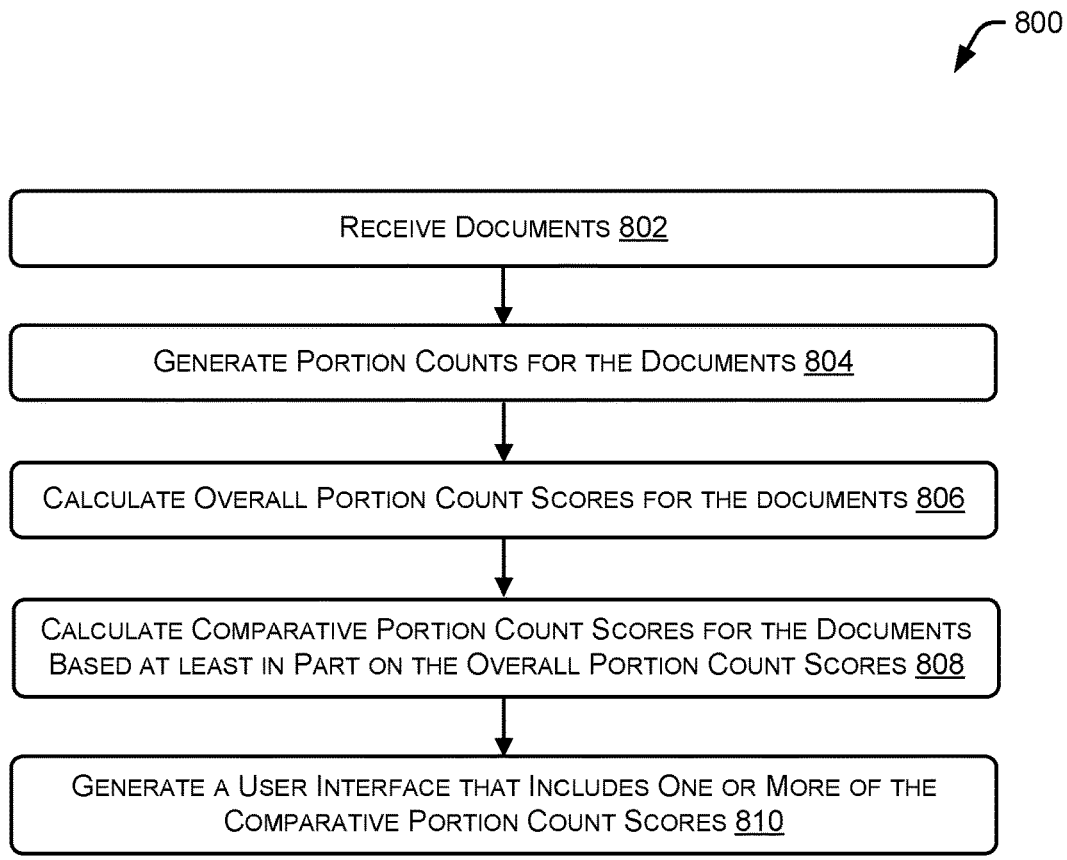
FIG. 8 is a flowchart illustrating an example method for automatic processing of documents to generate a user interface indicating portion count scores.

FIG. 8 is a flowchart depicting an example method 800 of automatically processing documents to generate a UI that illustrates comparative portion scores for the documents. At 802, documents are received. For instance, the documents may be received from one or more data repositories, such as data repositories 102. In some instances, the documents may contain text either in computer-readable form, or otherwise, and each document may be associated with a unique document identification number. This unique document identification number may be used to label the document as well as any sub-portions of the document. For some documents, specifically patent documents, the unique document identification number may be a patent number or a patent application publication number. In some instances, the documents may be stored locally in a memory device separate from the data repository that provided the documents.

In some instances, the documents are pre-processed to generate one or more processed document portions for each of the documents. The pre-processing may use all or part of the method 500 described in FIG. 5 and/or the method 600 described in FIG. 6. For instance, a processed document may refer to the document following pre-processing. In some instances, the pre-processing itself may divide a document into two or more processed document portions. For example, when analyzing text containing patent claims, the document may be divided into document portions (e.g., individual patent claims) at locations following a period and preceding a numeral. In some instances, each portion of the document is associated with the unique document identification number of the source document. For example, each patent claim from a patent would be associated with the patent number. The processed document portions include a portion of the text from the source document. The specific pre-processing techniques may include parsing text to separate words, removing stop words, removing duplicate words, and removing punctuation. In some instances, some or all of the stop words may be specific to a document classification of the documents. For example, if all of the documents are associated with the same patent classification, and there are specific stop words for that classification, then those specific stop words may be used instead of or in addition to general stop words. In some instances, pre-processing may include additional pre-processing techniques, such as replacing abbreviations and/or acronyms with the corresponding full words.

At 804, portion counts for the documents are generated. For instance, a value corresponding to the number of document portions within each of the documents may be generated. In some instances, the value for a document indicates each of the documents portions that are included in the document. Additionally or alternatively, in some instances, the value for a document indicates one or more of the document portions that are included in the document. For example, if a document includes a patent, and the document portions include independent claims and dependent claims within the patent, the value may indicate the number of independent claims in the patent. For another example, and again if a document includes a patent, and the document portions include independent claims and dependent claims within the patent, the value may indicate the broadest independent claim as well each of the dependent claims that depend from the broadest independent claim.

At 806, overall portion count scores are calculated for the documents. For instance, an overall portion count score may be calculated for each document based on the respective portion counts for the respective document. In some instances, the overall portion count score for a document includes the value as calculated at 804. Additionally or alternatively, in some instances, one or more of the document portions may be given more weight when calculating the overall portion count scores for the documents. For instance, if the documents include patents, more weight may be given to the independent claims than to the dependent claims when calculating the overall portion count scores. For example, if independent claims are given four times as much weight as dependent claims, and a patent includes three independent claims and seventeen dependent claims, the overall portion count score for the patent includes twenty-nine (e.g., (3*4)+17=29). An example equation for calculating the overall portion count scores for patents and/or printed publications may look as follows:

$$\text{Overall Score} = I_T(w_1) + D_T(w_2) \qquad (3)$$

As shown, the overall portion count score for a patent may include a number of independent claims ($I_T$) times a first weight ($w_1$) associated with independent claims plus a number of dependent claims ($D_T$) times a second weight ($w_2$) associated with dependent claims.

At 808, comparative portion count scores are calculated for the documents based at least in part on the overall portion count scores. For instance, a comparative portion count score for a document can be determined by comparing the overall portion count score for the document to the overall portion count scores of the other documents being analyzed. In some instances, the comparative portion count score for a document corresponds to the percentage of documents that include an overall portion count score that is equal to or less than the overall portion count score of the document. In some instances, the comparative portion count score for a document corresponds to the percentage of documents that include an overall portion count score that is less than the overall portion count score of the document. In some instances, the comparative portion count score for a document corresponds to the percentage of documents that include an overall portion count score that is equal to or greater than the overall portion count score of the document. Still, in some instances, the comparative portion score for a document corresponds to the percentage of documents that include an overall portion count score that is greater than the overall portion count score of the document.

At 810, a UI is generated that includes one or more of the comparative portion count scores. For instance, a UI may be generated such that a comparative portion count score for one of the documents is displayed in proximity to the unique document identification number associated with that document. For example, the comparative portion count score for a patent may be displayed next to the patent number. In some instances, the UI may be a textual UI or a command-line interface that displays a line of text including at least the comparative portion count score and the unique document identification number. In some instances, the UI may include information on documents either to highlight a particular document (e.g., one having a highest comparative portion count score out of all the documents in the analyzed corpus), due to limitations of screen real estate such as on mobile devices, to minimize a volume of data transmitted across a network, or for other reasons.

Due to the processing efficiencies obtained by using automatic computer-based analysis, in some instances, the generating portion counts at 804, calculating overall portion count scores at 806, and the calculating of the comparative portion count scores at 808 are performed at a rate much faster than can be achieved through human analysis. For example, this analysis may proceed at a rate of more than one document per minute, more than one document per 30 seconds, more than one document per 10 seconds, or another rate. This is a rate much faster than can be achieved by manual, human analysis.

Figure 9:
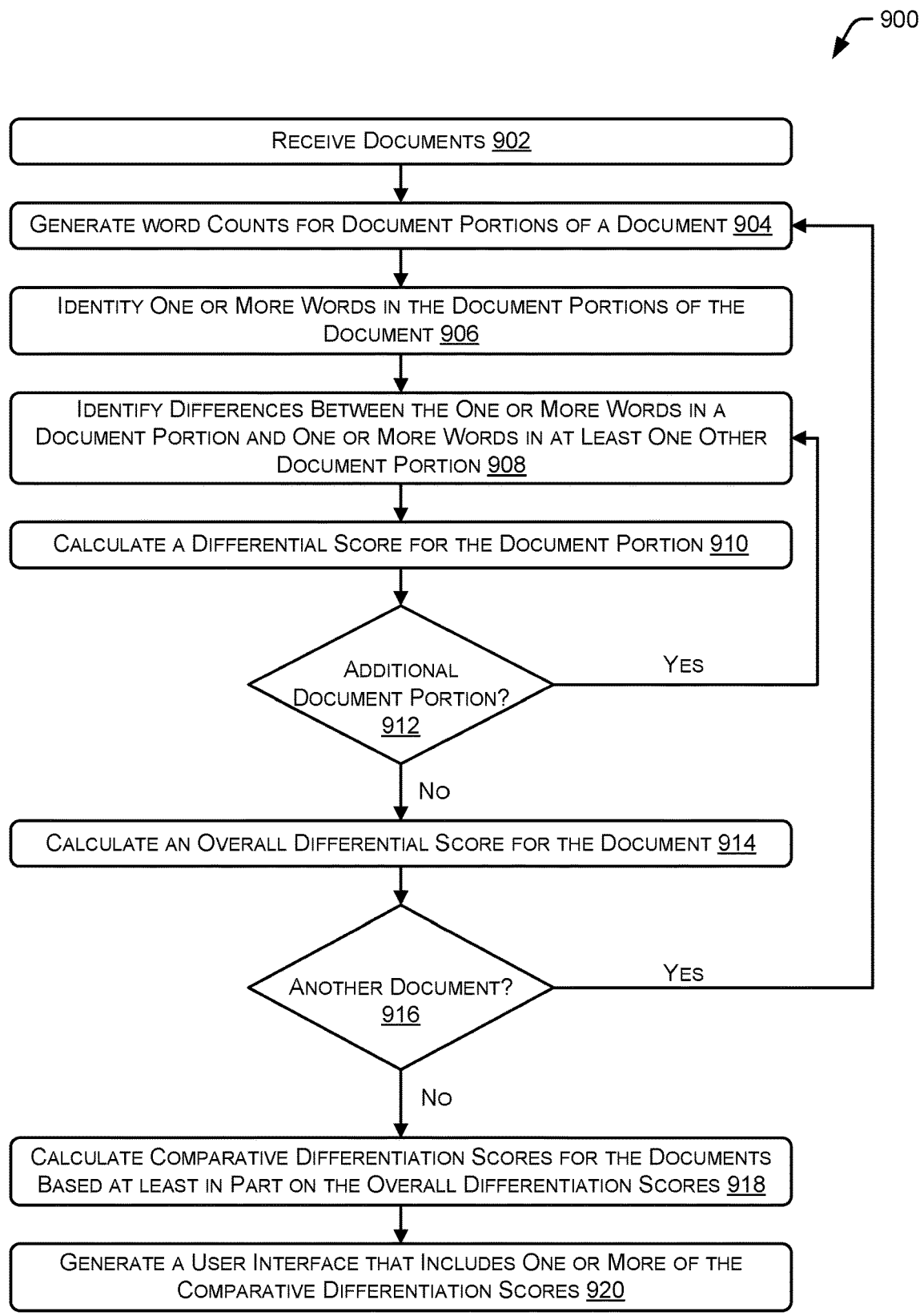
FIG. 9 is a flowchart illustrating an example method for automatic processing of documents to generate a user interface indicating differential scores.

FIG. 9 is a flowchart depicting an example method 900 of automatically processing documents to generate a UI that illustrates comparative differential scores for the documents. At 902, documents are received. For instance, the documents may be received from one or more data repositories, such as data repositories 102. In some instances, the documents may contain text either in computer-readable form, or otherwise, and each document may be associated with a unique document identification number. This unique document identification number may be used to label the document as well as any sub-portions of the document. For some documents, specifically patent documents, the unique document identification number may be a patent number or a patent application publication number. In some instances, the documents may be stored locally in a memory device separate from the data repository that provided the documents.

In some instances, the documents are pre-processed to generate one or more processed document portions for each of the documents. The pre-processing may use all or part of the method 500 described in FIG. 5 and/or the method 600 described in FIG. 6. For instance, a processed document may refer to the document following pre-processing. In some instances, the pre-processing itself may divide a document into two or more processed document portions. For example, when analyzing text containing patent claims, the document may be divided into document portions (e.g., individual patent claims) at locations following a period and preceding a numeral. In some instances, each portion of the document is associated with the unique document identification number of the source document. For example, each patent claim from a patent would be associated with the patent number. The processed document portions include a portion of the text from the source document. The specific pre-processing techniques may include parsing text to separate words, removing stop words, removing duplicate words, and removing punctuation. In some instances, some or all of the stop words may be specific to a document classification of the documents. For example, if all of the documents are associated with the same patent classification, and there are specific stop words for that classification, then those specific stop words may be used instead of or in addition to general stop words. In some instances, pre-processing may include additional pre-processing techniques, such as replacing abbreviations and/or acronyms with the corresponding full words.

At 904, word counts are generated for document portions of a document. For instance, a word count for each document portion of a document may be generated by counting a number of separate words in the respective document portions. In some instances, this may be performed after pre-processing so that stop words and duplicate words are omitted from the count. A word count performed after removal of duplicate words is referred to as a word count of unique words. In some instances, the word count generated for each document portion (e.g., patent claim) includes is an integer (e.g., one, two, three, etc.).

At 906, one or more words are identified in the document portions of the document. For instance, each of the words that are counted in step 904 may be identified for each document portion of the document. For example, if a document portion recites "audio signal representing sound," each of "audio", "signal", "representing", and "sound" may be identified for the document portion. In some instances, this may be performed after pre-processing so that stop words and duplicate words are omitted from the identification. An identification performed after removal of duplicate words is referred to as an identification of unique words.

At 908, differences between one or more words in a document portion and one or more words in at least one other document portion are identified. For instance, the words identified for a document portion may be compared to the words identified for at least one other document portion. In some instances, the comparing includes determining a number of words from the document portion that are included in the at least one other document portion and/or determining the number of words from the document portion that are not included in the at least one other document portion. For example, and using the example above where the document portion recites "audio signal representing sound," the comparing may include determining that the two words "audio" and "signal" are included in the at least one other document portion, but the two words "representing" and "sound" are not included in the at least one other document portion.

In some instances, when the document includes a patent and/or published application, comparing differences between one or more words in a claim to one or more words in at least one other claim may include comparing differences between one or more words in a dependent claim to one or more words in an independent claim. For example, a dependent claim may be compared to the independent claim from which it depends. For another example, a dependent claim may be compared to both an independent claim and any intervening dependent claim(s) from which the dependent claim depends. Still, for a third example, a dependent claim may be compared to the broadest independent claim within the patent and/or published application. Additionally or alternatively, in some instances, comparing differences between one or more words in a claim to one or more words in at least one other claim may include comparing differences between one or more words in an independent claim to one or more words in at least one other independent claim. For example, a narrower independent claim (e.g., an independent claim with a breadth score that is less than the breadth score of the broadest independent claim) may be compared to the broadest independent claim in the patent and/or published application.

At 910, a differential score is calculated for the document portion. For instance, a differential score may be calculated for the document portion using the word count for the document portion and the identified word differences for the document portion. In some instances, the differential score may correspond to a uniqueness in which words in the document portion differ from words in the at least one other portion. For example, and using the example above where the comparing determined that the two words "audio" and "signal" are included in the at least one other document portion, but the two words "representing" and "sound" are not included in the at least one other document portion, the differential score for the document portion may include 2/4 words or 50%. An example equation that may be used to determine the differential score for a document portion may look as follows:

$$\text{Differential Score} = W_U/wc \quad (4)$$

As shown, the differential score for a patent may include a number of uncommon words ($W_U$) included in the document portion divided by the word count (wc) for the document portion.

At 912, it is determined whether there are any additional document portions in the document that are to be analyzed. If it is determined that there is an additional document portion to analyze (i.e., Yes), the method 900 repeats back at step 908 for the additional document portion. In some instances, a respective differential score is calculated for each document portion in a document. In some instances, a respective differential score is calculated for each of one or more selected document portions in a document. For example, if a document includes a patent and/or published application, differentiation scores may be calculated for the broadest independent claim and each of the dependent claims that depend from the broadest independent claim. For another example, and again if the document includes a patent and/or published application, a respective differentiation score may be calculated for each of the independent claims.

If it is determined that there is not an additional document portion to analyze (i.e., No) at 912, the method 900 proceeds to 914. At 914, an overall differential score is calculated for the document. For instance, an overall differential score may be calculated for a document using one or more of the differential scores for one or more of the document portions. In some instances, calculating the overall differentiation score for a document includes calculating an average of the one or more differentiation scores. For example, the overall differentiation score may include the average of the respective differentiation scores of each document portion within the document. In some instances, calculating an overall differentiation score for a document includes taking the highest, the lowest, the median, of the like of the one or more differentiation scores.

In some instances, when a document includes a patent and/or published application, other techniques may be used calculate the overall differentiation score for the patent and/or published application. For example, if a document includes a patent, the overall differentiation score for the patent may include an average of the respective differentiation score(s) of each of the dependent claims that includes a dependency from the broadest independent claim within the patent. For a second example, and again if a document is a patent, the overall differentiation score for the patent may include an average of the respective differentiation score(s) of each independent claim that does not include the broadest independent claim.

For a third example, and again if the document is a patent, the overall differentiation score may include a combined differentiation score for each of the dependent claims that depends from a given independent claim. For instance, the overall differentiation score may be calculated based on a total number of words within dependent claims that depend from a broadest independent claim, and a uniqueness of the words within the dependent claims as compared to the broadest independent claim, using the processes described above.

At 916, it is determined whether there are any additional documents that that need to be analyzed. If it is determined that there is an additional document to analyze (i.e., Yes), the method 900 repeats back at step 904 for the additional document. For instance, word counts are generated for the document portions of the additional document at 904, one or more words are identified for the document portions at 906, differences between the one or more words in a document portion and one or words in at least one other document portion are identified at 908, respective differentiation scores are calculated for the document portions at 910, and an overall differentiation score is calculated for the additional document at 914.

If it is determined that there is not an additional document to analyze (i.e., No) at 916, the method 900 proceeds to 918. At 918, comparative differentiation scores are calculated for the documents based at least in part on the overall differentiation scores. For instance, a differentiation score for a document can be determined by comparing the overall differentiation score for the document to the overall differentiation scores of the other documents being analyzed. In some instances, the comparative differentiation score for a document corresponds to the percentage of documents that include an overall differentiation score that is equal to or less than the overall differentiation score of the document. In some instances, the comparative differentiation score for a document corresponds to the percentage of documents that include an overall differentiation score that is less than the overall differentiation score of the document. In some instances, the comparative differentiation score for a document corresponds to the percentage of documents that include an overall differentiation score that is equal to or greater than the overall differentiation score of the document. Still, in some instances, the comparative differentiation score for a document corresponds to the percentage of documents that include an overall differentiation score that is greater than the overall differentiation score of the document.

At 920, a UI is generated that includes one or more of the comparative differentiation scores. For instance, a UI may be generated such that a comparative differentiation score for one of the documents is displayed in proximity to the unique document identification number associated with that document. For example, the comparative differentiation score for a patent may be displayed next to the patent number. In some instances, the UI may be a textual UI or a command-line interface that displays a line of text including at least the comparative differentiation score and the unique document identification number. In some instances, the UI may include information on documents either to highlight a particular document (e.g., one having a highest comparative differentiation score out of all the documents in the analyzed corpus), due to limitations of screen real estate such as on mobile devices, to minimize a volume of data transmitted across a network, or for other reasons.

Although the above steps 904-916 describe determining differentiation between one or more portions and final differentiation scores based on word analysis within the document itself, in some instances, differentiation between one or more portions and final differentiation scores may be determined based on the differentiation "footprint" of the one or more portions relative to an entirety of the subject matter of the corpus of documents. For instance, a corpus of words based on words within the corpus of documents can be generated. Using the corpus of words, a portion differentiation score may be assigned to a one or more document portions by comparing words within the one or more document portions. In some instances, the number of unique words may be determined in the portion determined to have the broadest overall breadth score. For each additional document portion, the number of unique words that are not included in the portion having the broadest overall breadth score may be determined. In another example, the number of unique words that are included in that particular portion and not included in any other portion may be determined. In some instances, the number of unique words associated with each portion is then expressed as a percentage of the unique words within the corpus of words in the relevant documents. For example, if the corpus of words in the relevant documents includes 10,000 unique words, and a given document portion (e.g., independent claim) includes 20 unique words that are within the corpus of 10,000 unique words, then the percentage for the given document portion is 0.002%. If a second document portion (e.g., independent claim) also includes 20 unique words that are both within the corpus of 10,000 unique words and exclusive of the words in the first (or any other previously processed) document portion, then the percentage for the second document portion is also 0.002%.

The overall differentiation calculation can then be determined by summing the reciprocal of each percentage for a differentiation calculation of 1000 (1/0.002+1/0.002), giving more weight to portions with a relatively small percentage of the unique words of the corpus. In other instances, the reciprocal of one minus the percentage could be summed for each portion (i.e., 1/(1−0.002)+1/(1−0.002)=2.004), giving more weight to portions with a relatively large percentage of the unique words of the corpus. In other instances, the reciprocal of the percentage for the broadest portion could be used and the reciprocal of one minus the percentage could be used for all other portions. In still other instances, the summation could be made after further weighting to the contribution of individual portions (e.g., in the context of patent documents, weighting the contribution of independent claims more heavily than the contribution of dependent claims). In this manner, a document with many document portions having unique words that are not common to other portion within the document will have a relatively high overall differentiation score.

After determining the overall differential scores, steps 918 and 920 can then be performed. For instance, at 918, comparative differentiation scores are calculated for the documents based at least in part on the overall differentiation scores. For instance, a differentiation score for a document can be determined by comparing the overall differentiation score for the document to the overall differentiation scores of the other documents being analyzed. At 920, a UI is generated that includes one or more of the comparative differentiation scores. For instance, a UI may be generated such that a comparative differentiation score for one of the documents is displayed in proximity to the unique document identification number associated with that document.

Due to the processing efficiencies obtained by using automatic computer-based analysis, in some instances, the word count generated at 904, the identifying the one or more words at 906, the identifying the differences at 908, the calculating of the differentiation scores at 910, the calculating of the overall differentiation score at 914, and the calculating of the comparative differentiation scores at 918 are performed at a rate much faster than can be achieved through human analysis. For example, this analysis may proceed at a rate of more than one document per minute, more than one document per 30 seconds, more than one document per 10 seconds, or another rate. This is a rate much faster than can be achieved by manual, human analysis.

Figure 10:
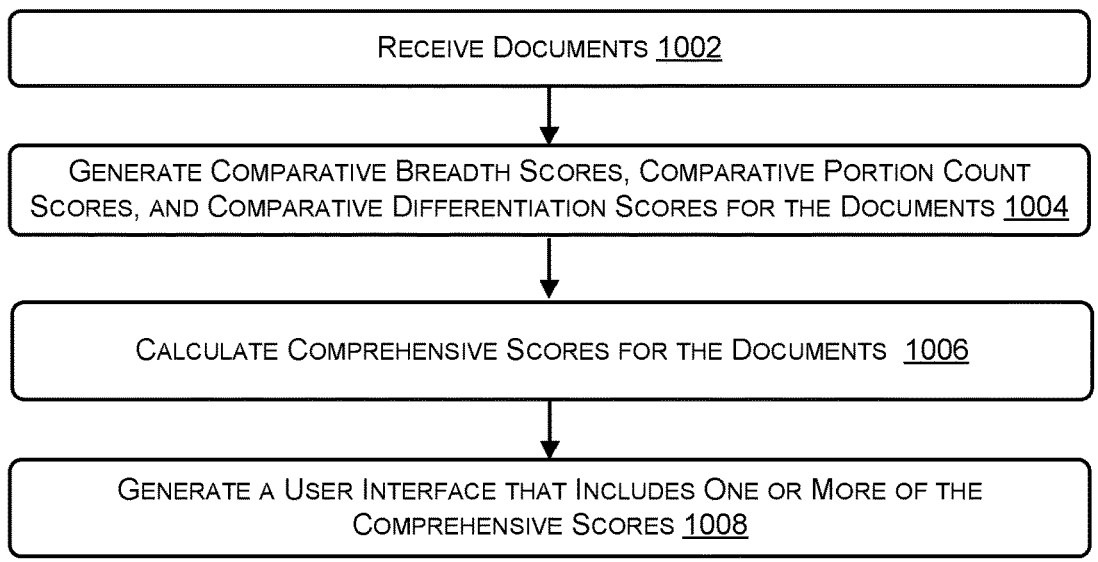
FIG. 10 is a flowchart illustrating an example method for automatic processing of documents to generate a user interface indicating comprehensive document scores.

FIG. 10 is a flowchart depicting an example method 1000 of automatically processing documents to generate a UI that illustrates comprehensive scores for the documents. At 1002, documents are received. For instance, the documents may be received from one or more data repositories, such as data repositories 102. In some instances, the documents may contain text either in computer-readable form, or otherwise, and each document may be associated with a unique document identification number. This unique document identification number may be used to label the document as well as any sub-portions of the document. For some documents, specifically patent documents, the unique document identification number may be a patent number or a patent application publication number. In some instances, the documents may be stored locally in a memory device separate from the data repository that provided the documents.

In some instances, the documents are pre-processed to generate one or more processed document portions for each of the documents. The pre-processing may use all or part of the method 500 described in FIG. 5 and/or the method 600 described in FIG. 6. For instance, a processed document may refer to the document following pre-processing. In some instances, the pre-processing itself may divide a document into two or more processed document portions. For example, when analyzing text containing patent claims, the document may be divided into document portions (e.g., individual patent claims) at locations following a period and preceding a numeral. In some instances, each portion of the document is associated with the unique document identification number of the source document. For example, each patent claim from a patent would be associated with the patent number. The processed document portions include a portion of the text from the source document. The specific pre-processing techniques may include parsing text to separate words, removing stop words, removing duplicate words, and removing punctuation. In some instances, some or all of the stop words may be specific to a document classification of the documents. For example, if all of the documents are associated with the same patent classification, and there are specific stop words for that classification, then those specific stop words may be used instead of or in addition to general stop words. In some instances, pre-processing may include additional pre-processing techniques, such as replacing abbreviations and/or acronyms with the corresponding full words.

At 1004, comparative breadth scores, comparative portion count scores, and comparative differentiation scores for the documents are generated. For instance, in some examples, the documents may be analyzed using method 700 in order to generate the comparative breadth scores for the documents, the documents may be analyzed using method 800 in order to generate the comparative portion count scores for the documents, and the documents may be analyzed using method 900 in order to generate the comparative differentiation scores for the documents. Additionally or alternatively, in some examples, the comparative breadth scores, the comparative portion count scores, and the comparative differentiation scores may be received from one or more external sources. For instance, the comparative breadth scores, the comparative portion count scores, and the comparative differentiation scores may be received one or more computing devices.

At 1006, comprehensive scores are calculated for the documents. For instance, comprehensive scores may be calculated for each document using the comparative breadth score, the comparative portion count score, and the comparative differentiation score for a respective document. In some instances, calculating the comprehensive score for a document can include calculating the average of the comparative breadth score, the comparative portion count score, and the comparative differentiation score for the document. In some instances, calculating the comprehensive score for a document can include taking the highest, the lowest, the median, of the like of the comparative breadth score, the comparative portion count score, and the comparative differentiation score for the document.

Still, in some instances, one or more of the comparative breadth scores, comparative portion count scores, and comparative differentiation scores may be given more weight when calculating the comprehensive scores for the documents. For instance, the comprehensive scores for the documents may be calculated using the following formula:

$$\text{Comprehensive Score} = \frac{W_1(B_F) + W_2(P_F) + W_3(D_F)}{3} \quad (5)$$

In the above equation, the comprehensive score for a document includes a first weight ($W_1$) times the comparative breadth score ($B_F$) of the document, plus a second weight ($W_2$) times the comparative portion count score ($P_F$) of the document, plus a third weight ($W_3$) times the comparative differentiation score ($D_F$) of the document, divided by three. In some instances, one or more of the first weight ($W_1$), the second weight ($W_2$), or the third weight ($W_3$) may include a similar value. Additionally or alternatively, in some instances, each of the first weight ($W_1$), the second weight ($W_2$), or the third weight ($W_3$) may include a unique value.

At 1008, a UI is generated that includes one or more of the comprehensive scores. For instance, a UI may be generated such that a comprehensive score for one of the documents is displayed in proximity to the unique document identification number associated with that document. For example, the comprehensive score for a patent may be displayed next to the patent number. In some instances, the UI may be a textual UI or a command-line interface that displays a line of text including at least the comprehensive score and the unique document identification number. In some instances, the UI may include information on documents either to highlight a particular document (e.g., one having a highest comprehensive score out of all the documents in the analyzed corpus), due to limitations of screen real estate such as on mobile devices, to minimize a volume of data transmitted across a network, or for other reasons.

Illustrative Computing Device(s)

Figure 11:
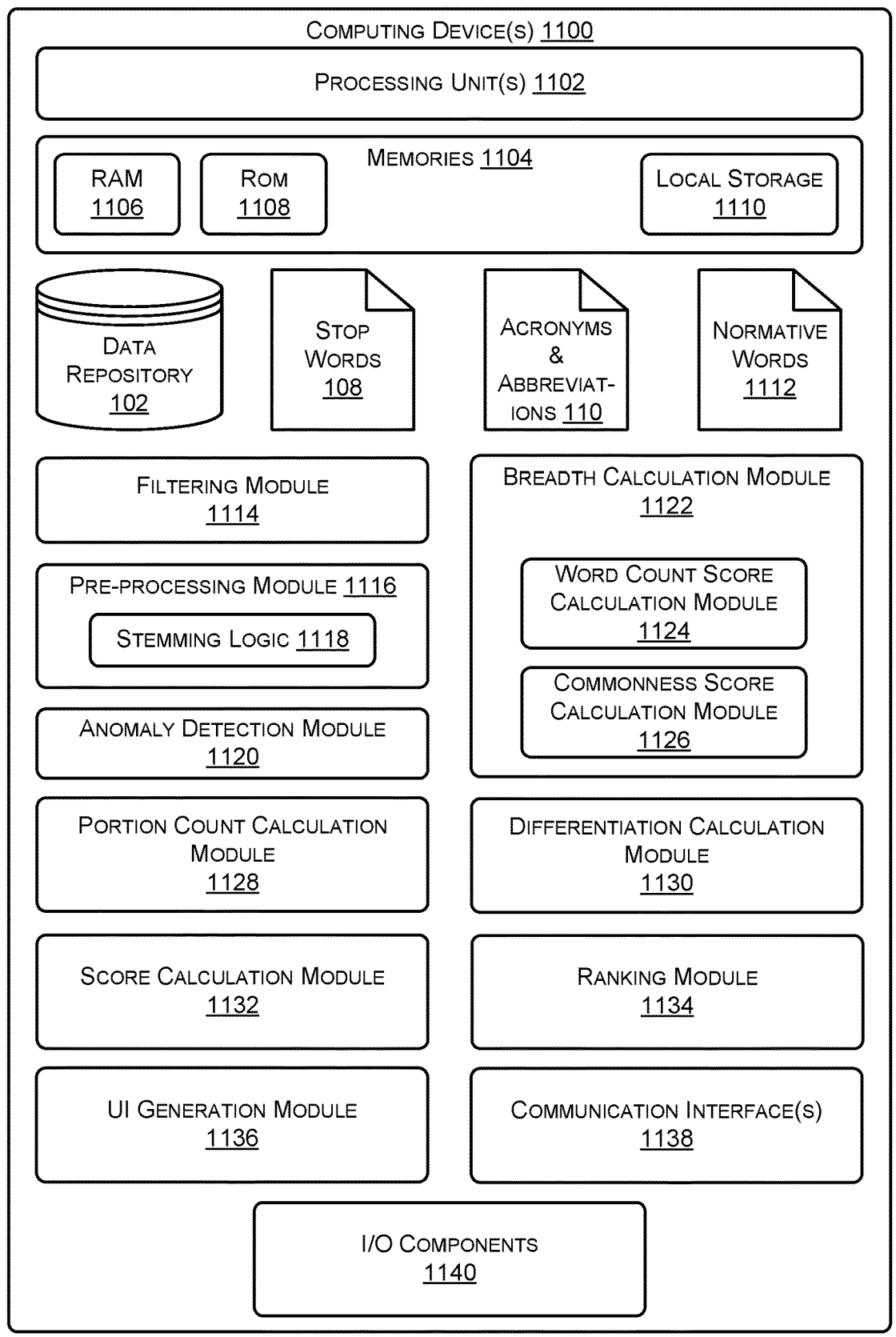
FIG. 11 shows a schematic diagram of one or more computing devices designed for automatic, human-emulative processing of documents.

FIG. 11 shows a schematic block diagram of an example computing device(s) 1100. Examples of the computing device(s) 1100 may include a server, a desktop PC (personal computer), a notebook or portable computer, a workstation, a mainframe computer, a handheld device, a netbook, an Internet appliance, a portable reading device, an electronic book reader device, a tablet or slate computer, a game console, a mobile device (e.g., a mobile phone, a personal digital assistant, a smart phone, etc.), or a combination thereof. The computing device(s) 1100 may be implemented as a single device or as a combination of multiple physically distinct devices. For example, computing device(s) 1100 may be implemented as a combination of a server and a client.

The computing device(s) 1100 may include one or more processing units 1102 and memories 1104, both of which may be distributed across one or more physical or logical locations. The processing unit(s) 1102 may include any combination of central processing units (CPUs), graphical processing units (GPUs), single core processors, multi-core processors, processor clusters, application-specific integrated circuits (ASICs), programmable circuits such as Field Programmable Gate Arrays (FPGA), Application-specific Standard Products (ASSPs), System-on-a-chip systems (SOCs), Complex Programmable Logic Devices (CPLDs), and the like. One or more of the processing unit(s) 1102 may be implemented in software or firmware in addition to hardware implementations. Software or firmware implementations of the processing unit(s) 1102 may include computer- or machine-executable instructions written in any suitable programming language to perform the various functions described. Software implementations of the processing unit(s) 1102 may be stored in whole or part in the memories 1104.

The memories 1104 are representative of any number of forms of memory including both persistent and non-persistent memory. In some instances, the memories 1104 may include computer-readable media in the form of volatile memory, such as random access memory (RAM) 1106 and/or non-volatile memory, such as read only memory (ROM) 1108 or flash RAM. RAM 1106 includes, but is not limited to, integrated circuits, phase change memory (PRAM), static random-access memory (SRAM), dynamic random-access memory (DRAM), and other types of RAM. ROM 808 includes erasable programmable read-only memory (EPROM), electrically erasable programmable read-only memory (EEPROM), flash memory, and NAND flash. Memories 1104 of the computing device(s) 1100 may also include removable storage, non-removable storage, and/or local storage 1110 to provide long- or short-term storage of computer-readable instructions, data structures, program modules, and other data.

The memories 1104 are an example of computer-readable media. Computer-readable media includes at least two types of media: computer-readable storage media and communications media. Computer-readable storage media includes volatile and non-volatile, removable and non-removable media implemented in any method or technology for storage of information such as computer readable instructions, data structures, program modules, or other data, RAM 1106, ROM 1108, flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable storage media does not include transitory media such as modulated data signals and carrier waves.

In contrast, communications media may embody computer-readable instructions, data structures, program modules, or other data in a modulated data signal, such as a carrier wave, or other transmission mechanism. As defined herein, computer-readable storage media and communications media are mutually exclusive.

In some instances, the memories 1104 may include a plurality of databases such as the data repository 102. However, as noted above, in other examples the data repository 102 may be separate from the both the memories 1104 and the computing device(s) 1100. The one or more data repositories 102 may contain a collection of patent documents such as issued patents or published patent applications. The collection of patents or patent applications may be defined by, for example, a portfolio of a patent owner, a classification of a taxonomy (e.g., public taxonomy such as a classification system of a patent office or governmental agency, a private taxonomy such as a taxonomy for a private company, a taxonomy set by a standards body or an industry, etc.), results of a search, or any other collection of patent documents.

By way of example and not limitation, the memories 1104 may also include multiple words and/or phrases such as the stop words 108 and the acronyms and abbreviations 110 as shown in FIGS. 1-3, as well as other words such as normative words 1112. Any or all of the collections words and/or phrases may be stored in the memories 1104 as lists or may be directly included into computer code corresponding to one of the modules described below.

A filtering module 1114 may be present in the memories 1104 and coupled to the one or more processing unit(s) 1102. The filtering module 1114 may modify the data obtained from the data repository 102 to generate a reduced set of data that is the corpus of documents for subsequent analysis. The filtering module 1114 may perform any or all of the method 600 shown in FIG. 6. The filtering module 1114 place documents from the data repository 102 that are retained post filtering into local storage 1110 of the computing device(s) 1100. Presence of the filtered documents in the local storage 1110 may provide for faster analysis by the other modules as compared to accessing the documents in a remote storage location.

A pre-processing module 1116 may be present in the memories 1104 and coupled to the one or more processing unit(s) 1102. The pre-processing module 1116 may process document portions such as patent claims prior to determination of breadth, number of portions, and differentiation. This pre-processing may include delimiting individual claims, stemming words to root forms, removing duplicate root forms, and removing stop words 108. The pre-processing module 1116 may perform any or all of method 700 shown in FIG. 7. In some instances, the stop words 108 may come from a stop word adjustment file that is read in and used for the processing of document portions. The stop word adjustment file may be specific to a given portfolio or corpus of documents.

The pre-processing module 1116 may include stemming logic 1118. The stemming logic 1118 generates root forms of words using a stemming algorithm. A stemming algorithm is a process of linguistic normalization, in which the variant forms of a word are reduced to a common form or a root form. There are many possible stemming algorithms which may be used including use of a lookup table, suffix stripping, Lemmatisation, stochastic algorithms, n-gram analysis, matching algorithms, Porter, Porter2, Paice-Husk, Lovins, and Porter Stemmer. Porter stemmer follows the algorithm presented in Porter, M "An algorithm for suffix stripping." Program 14.3 (1980): 130-137. The stemming logic 1118 may function in part by passing values to an external stemming operation and receiving results back. One technique for implementing this is by using an API to call an external module or computing system that provides stemming functionality. An application program interface (API) is a set of routines, protocols, and tools for building software applications. An API specifies how software components should interact. APIs that provide stemming include EnClout Stemmer, EnClout Term Analysis, and Text-Processing.

An anomaly detection module 1120 may be present in the memories 1104 and coupled to the one or more processing unit(s) 1102. The anomaly detection module 1120 may detect two types of anomalies: anomalies that lead to removal of a patent claim from further analysis and anomalies that result in flagging a patent claim for manual review. The anomaly detection module 1120 may include claim removal logic that is configured to detect and remove deleted claims from the claims under consideration for analysis of breadth, number of portions, and differentiation. Removing deleted claims may include deleting records corresponding to those claims or indicating that the records correspond to the claims are to be ignored during subsequent analysis. Claim flagging logic may be present in the anomaly detection module 1120 and configured to generate a flag or other indicium that is associated with those flags which have a type of anomaly that warrants further evaluation but not removal.

The anomaly detection module 1120 may reference one or more lists of stop words 108 and/or normative words 1112. The referencing may be done during processing by reading in a list or the list may be integrated into the code that is performing the anomaly detection. In either implementation, part of the section may include a comparison between words in a portion of a document and "anomalous" words. This comparison may be implemented in part by use of one or more lookup tables. The lookup tables may be pre-calculated and stored in static program storage, calculated (or "pre-fetched") as part of a program's initialization phase (memoization), or even stored in hardware in application-specific platforms. In some programmatic implementations, the lookup tables may include pointer functions (or offsets to labels) to process the matching input. To improve processing speed, one or more field-programmable gate arrays (FPGA) may use reconfigurable, hardware-implemented, lookup tables to provide programmable hardware functionality. For example, and to potentially increase processing speed, a list of default stop words and/or a list of the normative words 1112 could be configured as hardware-implemented lookup tables.

A breadth calculation module 1122 may be present in the memories 1104 and coupled to the one or more processing unit(s) 1102. The breadth calculation module 1122 may be configured to calculate breadth scores for document portions of documents being analyzed, use the breadth scores to calculate overall breadth scores for documents, and then use the overall breadth scores to calculate comparative breadth scores for the documents. If the document portions are patent claims, then the breadth calculation module 1122 may calculate claim breadth scores for one or more of the independent claims and/or one or more of the dependent claims, and then calculate overall breadth scores for patents using the claim breadth scores. In some instances, this calculation may be performed only for the claims or other document portions that are not removed by either the pre-processing module 1116 or the anomaly detection module 1120.

As described above, in some instances, breadth is based on the "footprint" in which one or more document portions cover an entirety of the subject matter of the corpus of documents. Additionally or alternatively, in some instances, breadth is based on a word count score and a commonest score. Thus, the breadth calculation module 1122 may include one or both of a word count score calculation module 1124 and a commonness score calculation module 1126. The breadth calculation module 1122 may perform any or all of operations 704-724 of method 700 shown in FIG. 7.

The word count score calculation module 1124 may be configured to determine a word count score for a document portion based on a word count for the document portion and a maximum word count for another document portion that has the highest word count. In some instances, the document portion under analysis and the other document portion with the highest word count are both drawn from the same corpus of documents. Thus, the word count score calculation module 1124 may determine a word count for each document portion under analysis and identify which of those document portions has the most words. In some instances, the word count score calculation module 1124 may contain a set of rules for determining word counts for the document portions.

The commonness score calculation module 1126 may be configured to determine a commonness score for the document portion based on the frequencies in which individual words in the document portion occur throughout all of the document portions in the corpus of documents. The commonness score calculation module 1126 may determine a commonness score for each document portion under analysis and identify which of those document portions is the most "common" due to having the highest commonness score. In some instances, the ratio of a document portion's individual commonness score and the highest commonness score may be used to represent the commonness score for that document portion for the purposes of calculating breadth. In some instances, the commonness score calculation module 1126 may contain a set of rules for determining the commonness scores. The breadth calculation module 1122 may combine results generated by the word count score calculation module 1124 and the commonness score calculation module 1126 to generate a breadth score for each document portion.

A portion count calculation module 1128 may be present in the memories 1104 and coupled to the one or more processing unit(s) 1102. The portion count calculation module 1128 may be configured to calculate comparative portion count scores for documents that are being analyzed. For instance, the portion count calculation module 1128 may determine a respective value corresponding to the number of document portions within each of the documents, and then compare the respective value for each document with the values of the other documents being analyzed to determine respective overall portion scores for the documents. In some instances, when documents include patents and/or patent applications, the portion count calculation module 1128 may give more weight to one or more independent claims or one or more dependent claims when calculating the overall portion count scores. The portion count calculation module 1128 can then use the overall portion count scores of the documents to calculate comparative portion count scores for the documents. The portion count calculation module 1128 may perform any or all of operations 804-808 of method 800 shown in FIG. 8.

A differentiation calculation module 1130 may be present in the memories 1104 and coupled to the one or more processing unit(s) 1102. The differentiation calculation module 1130 may be configured to calculate comparative differentiation scores for documents that are being analyzed. For instance, differentiation of document portions may be analyzed based on consideration of word counts and differentiation of words between document portions within a given document. For example, for a given document portion of a given document, the differentiation score module 1130 can determine a number of the words within the given document portion. Additionally, the differentiation calculation module 1130 can compare words in the given document portion to words in at least one other document portion (e.g., the broadest document portion) in the given document to determine a number of words in the given document portion that are unique. The differentiation calculation module 1130 can then calculate a differentiation score for the given document portion based on the number of words and the number of unique words. Additionally, the differentiation calculation module 1130 can calculate an overall differentiation score for the given document based on the differentiation scores of one or more of the document portions of the given document. The differentiation calculation module 1130 can then use the overall differentiation scores for the documents to calculate comparative differentiation scores for the document. The differentiation calculation module 1130 may perform any or all of operations 904-918 of method 800 shown in FIG. 9.

A score calculation module 1132 may be present in the memories 1104 and coupled to the one or more processing unit(s) 1102. The score calculation module 1132 may be configured to calculate comprehensive scores for documents that are being analyzed. For instance, the score calculation module 1132 may calculate a comprehensive score for each document based on the comparative breadth score, the comparative portion count score, and the comparative differentiation score for the respective document. In some instances, the score calculation module 1132 can calculate the comprehensive score for a document by taking an average (and/or median, mean, mode, lowest score, highest score, etc.) of the comparative breadth score, the comparative portion count score, and the comparative differentiation score. In some instances, the score calculation module 1132 may weigh one or more of the comparative breadth score, the comparative portion count score, and the comparative differentiation score when calculating the comprehensive score for a document. The score calculation module 1132 may perform any or all of operations 1004 and 1006 of method 1000 shown in FIG. 10.

A ranking module 1134 may be present in the memories 1104 and coupled to the one or more processing unit(s) 1102. The ranking module 1134 may be configured to rank the analyzed documents by comparative breadth scores, comparative portion count scores, comparative differentiation scores, and/or comprehensive overall scores. For example, the ranking module 1134 may rank a number of patents based on the comparative breadth scores for the patents, the comparative portion count scores for the patents, the comparative differentiation scores for the patents, and/or the comprehensive scores for the patents.

In an implementation, the ranking module 1134 may additionally bin the results of the ranking into one of a set number of values. One binning implementation is by percentiles. Thus, the top 1% of the analyzed documents in terms of comprehensive scores would be all the given a rank of 100. The binning may divide the ranked documents into any number of different bins such as three different bins (e.g., high, medium, and low), 10 different bins, 100 different bins, or more. Thus, instead of 100,000 documents ranked from 1 to 100,000 in terms of final overall scores, with each ranking being unique, each document may have a rank from 1 to 100 with several documents sharing each numerical level.

Some of the operations described above include summation, subtraction, multiplication, and/or division. The processing unit(s) 1102 may implement these operations by use of floating point computations. Floating point is a formulaic representation that approximates a real number so as to support a trade-off between range and precision. A number is, in general, represented approximately to a fixed number of significant digits (the significand) and scaled using an exponent in some fixed base; the base for the scaling is normally two, ten, or sixteen. A number that can be represented exactly is of the following form: significand x $base^{exponent}$, where significand is an integer base is an integer greater than or equal to two, and exponent is also an integer. The term floating point refers to the fact that a number's radix point (decimal point, or, more commonly in computers, binary point) can "float"; that is, it can be placed anywhere relative to the significant digits of the number. This position is indicated as the exponent component, and thus the floating-point representation is a form of scientific notation.

A floating-point system can be used to represent, with a fixed number of digits, numbers of different orders of magnitude. The result of this dynamic range is that the numbers that can be represented are not uniformly spaced; the difference between two consecutive representable numbers grows with the chosen scale. One example technique for floating point calculation is described in the IEEE 754 Standard. The current version, IEEE 754-2008 published in August 2008. The international standard ISO/IEC/IEEE 60559:2011 (with content identical to IEEE 754-2008) is published as ISO/IEC/IEEE 60559:2011 "Information technology—Microprocessor Systems—Floating-Point arithmetic."

A floating-point number consists of two fixed-point components, whose range depends exclusively on the number of bits or digits in their representation. The components linearly depend on their range, the floating-point range linearly depends on the significant range and exponentially on the range of exponent component, which attaches outstandingly wider range to the number. On an example computer system, a 'double precision' (64-bit) binary floating-point number has a coefficient of 53 bits (one of which is implied), an exponent of 11 bits, and one sign bit. Positive floating-point numbers in this format have an approximate range of $10^{-308}$ to $10^{308}$, because the range of the exponent is [−1022, 1023] and 308 is approximately $\log_{10}(2^{1023})$. The complete range of the format is from about $-10^{308}$ through $+10^{308}$ (see IEEE 754).

The number of normalized floating-point numbers in a system (B, P, L, U) where B is the base of the system, P is the precision of the system to P numbers, L is the smallest exponent representable in the system, and U is the largest exponent used in the system) is 2(B−1)(BP−1)(U−L+1)+1.

There is a smallest positive normalized floating-point number, Underflow level=UFL=BL which has a 1 as the leading digit and 0 for the remaining digits of the significand, and the smallest possible value for the exponent. There is a largest floating-point number, Overflow level=OFL=(1−B−P)(BU+1) which has B−1 as the value for each digit of the significand and the largest possible value for the exponent.

A UI generation module 1136 may be present in the memories 1104 and implemented by the processing unit(s) 1102. The UI generation module 1136 may generate or provide instructions to generate one or more user interfaces such as command-line user interfaces and/or graphic user interfaces. A command-line interface (also known as a command language interpreter (CLI), a command-line user interface, a console user interface, or a character user interface (CUI)), is an interface for interacting with a computer program where the user (or client) issues commands to the program in the form of successive lines of text (command lines). The interface is usually implemented with a command line shell, which is a program that accepts commands as text input and converts commands to appropriate operating system functions.

A GUI is a program interface that takes advantage of a computer's graphics capabilities to make the program easier to use. Well-designed GUIs can free a user from learning complex command languages. In some instances, the UI generation module 1136 may generate a GUI such as the UI 120 shown in FIG. 1, the UI 206 shown in FIG. 2, the UI 308 shown in FIG. 3, and/or the UI 412 shown in FIG. 4.

The computing device(s) 1100 may include one or more communication interfaces 1138 for receiving and sending information. The communication interfaces 1138 may communicatively couple the computing device(s) 1100 to a communications network using any conventional networking protocol or technology. The computing device(s) 1100 may also include input-output (I/O) components 1140 for receiving input from human operators (e.g., a keyboard) and providing output (e.g., a monitor) to the human operators.

Conclusion

Although the subject matter has been described in language specific to structural features, it is to be understood that the subject matter defined in the appended claims is not necessarily limited to the specific features described. Rather, the specific features are disclosed as illustrative forms of implementing the claims.

The terms "a," "an," "the" and similar referents used in the context of describing the invention (especially in the context of the following claims) are to be construed to cover both the singular and the plural, unless otherwise indicated herein or clearly contradicted by context. As used herein in this document "or" means and/or. For example, "A or B" means A without B, B without A, or A and B. The term "based on" is to be construed to cover both exclusive and nonexclusive relationships. For example, "A is based on B" means that A is based at least in part on B and may be based wholly on B.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

Furthermore, references have been made to publications, patents, or patent applications (collectively "references") throughout this specification. Each of the cited references is individually incorporated herein by reference for their particular cited teachings as well as for all that they disclose.

EXAMPLE CLAUSES

A: A system comprising: one or more processors; and one or more computer-readable media storing instructions that, when executed by the one or more processors, cause the one or more processor to perform operations comprising: receiving a plurality of documents, each document of the plurality of documents including a respective plurality of portions of text; calculating, for a document of the plurality of documents, a word count score for each portion of text of the plurality of portions of text based at least in part on a word count associated with the respective portion of text and word counts associated with portions of text from at least one other document of the plurality of documents; calculating a commonness score for each portion of text of the plurality of portions of text based at least in part a frequency in which words within the respective portion of text are found in the portions of text from the at least one other document; calculating a breadth score for each portion of text of the plurality of portions of text based at least in part on the word count score and the commonness score for the respective portion of text; calculating an overall breadth score for the document based at least in part on the breadth scores for the plurality of portions of text; calculating a first score for the document by comparing the overall breadth score to at least one other overall breadth score for the at least one other document; determining a value corresponding to a number of portions of text that are included in the plurality of portions of text of the document; calculating a second score for the document by comparing the value to at least one other value corresponding to a number of portions of text included in the at least one other document; calculating a differentiation score for each portion of text of the plurality of portions of text, the differentiation score for a respective portion of text being based at least in part on comparing words included in the respective portion of text to words included in at least one additional portion of text of the plurality of portions of text; calculating a third score for the document based at least in part on the differentiation scores of the plurality of portions of text; calculating a comprehensive score for the document using the first score, the second score, and the third score; and generating a user interface that includes at least the comprehensive score for the document.

B: The system as paragraph A recites, wherein calculating the comprehensive score for the document comprises calculating an average of the first score, the second score, and the third score.

C: The system as either paragraph A or paragraph B recites, the operations further comprising: calculating a first weighted score by multiplying the first score by a first weight; calculating a second weighted score by multiplying the second score by a second weight, wherein the second weight is different than the first weight; and calculating a third weighted score by multiplying the third score by a third weight, wherein the third weight is different than at least one of the first weight or the second weight, wherein calculating the comprehensive score for the document comprises calculating an average of the first weighted score, the second weighted score, and the third weighted score.

D: The system as any one of paragraphs A-C recites, the operations further comprising: determining respective values corresponding to a number of portions of text included in respective documents of the plurality of documents, wherein calculating the second score by comparing the value to the at least one other value comprises calculating a percentage of documents from the plurality of documents that include a respective value that is less than or equal to the value for the document.

E: The system as any one of paragraphs A-D recites, the operations further comprising: calculating respective overall breadth scores for respective documents of the plurality of documents, wherein calculating the first score by comparing the overall breadth score to the at least one other overall breadth score comprises calculating a percentage of documents from the plurality of documents that include a respective overall breadth score that is less than or equal to the overall breadth score of the document.

F: The system as any one of paragraphs A-E, the operations further comprising: calculating an overall differentiation score for the document by taking an average of the differentiation scores for the plurality of portions of text; and calculating respective overall differentiation scores for respective documents of the plurality of documents, wherein calculating the third score comprises calculating a percentage of documents from the plurality of documents that include a respective overall differentiation score that is less than or equal to the overall differentiation score of the document.

G: A method comprising: obtaining a plurality of patents, a first patent of the plurality of patents including a plurality of claims; generating, for the first patent, claim breadth scores for the plurality of claims, a claim breadth score of the claim breadth scores being based at least in part on a word count score and a commonness score for a respective claim of the plurality of claims; generating an overall breadth score for the first patent using the claim breadth scores for the plurality of claims; generating a first score associated with the first patent based on least in part on the overall breadth score and at least one other overall breadth score associated with at least a second patent of the plurality of patents; generating, for the first patent, differential scores for the plurality of claims, a differential score of the differential scores being based at least in part on differences between words included in the respective claim and words included in at least one other claim of the plurality of claims; generating an overall differential score for the first patent using the differential scores for the plurality of claims; generating a second score associated with the first patent based at least in part on the overall differential score and at least one other overall differential score associated with the at least the second patent; generating a comprehensive score for the first patent based at least in part on the first score and the second score; and generating a user interface that includes at least the comprehensive score for the first patent.

H: The method as paragraph G recites, further comprising: determining a number of claims that are included in the plurality of claims; comparing the number of claims included in the first patent to a number of claims included in the at least the second patent; and generating a third score for the first patent based at least in part on comparing the number of claims included the first patent to the number of claims included in the at least the second patent, wherein generating the comprehensive score is further based at least in part on the third score.

I: The method as paragraph H recites, wherein generating the comprehensive score comprises calculating an average of the first score, the second score, and the third score.

J: The method as either paragraph H or paragraph I recites, further comprising: calculating a first weighted score by multiplying the first score by a first weight; calculating a second weighted score by multiplying the second score by a second weight; and calculating a third weighted score by multiplying the third score by a third weight, wherein generating the comprehensive score comprises calculating an average of the first weighted score, the second weighted score, and the third weighted score.

K: The method as any one of paragraphs H-J recites, wherein: determining the number of claims comprises determining a number of independent claims and a number of dependent claims included in the plurality of claims; and comparing the number of claims included the first patent to the number of claims included in the at least the second patent comprises comparing: the number of independent claims included in the first patent to a number of independent claims included in the at least the second patent; and the number of dependent claims included in the first patent to a number of dependent claims included in the at least the second patent.

L: The method as any one of paragraphs G-K recites, further comprising: generating respective overall breadth scores for respective patents of the plurality of patents, the respective overall breadth scores including the at least one other overall breadth score, wherein generating the first score comprises calculating a percentage of patents from the plurality of patents that include a respective overall breadth score that is less than or equal to the overall breadth score of the first patent.

M: The method as any one of paragraphs G-L recites, further comprising: generating respective differential scores for respective patents of the plurality of patents, the respective differential scores including the at least one other differential score, wherein generating the second score comprises calculating a percentage of patents from the plurality of patents that include a respective differential score that is less than or equal to the overall differential score of the first patent.

N: A system comprising: one or more processors; and one or more computer-readable media storing instructions that, when executed by the one or more processors, cause the one or more processor to perform operations comprising: obtaining a plurality of patents, an individual patent of the plurality of patents including at least one claim; generating, for a first patent of the plurality of patents, claim breadth scores for a plurality of claims included in the first patent, a claim breadth score of the claim breadth scores being based at least in part on a word count score and a commonness score for a respective claim of the plurality of claims; generating an overall breadth score for the first patent using the claim breadth scores for the plurality of claims; generating a first score associated with the first patent based on least in part on the overall breadth score and at least one other overall breadth score associated with at least a second patent of the plurality of patents; generating a value representing a number of claims that are included in the plurality of claims; generating a second score associated with the first patent based at least in part on the value and at least one other value representing a number of claims included in the at least the second patent; generating a comprehensive score for the first patent based at least in part on the first score and the second score; and generating a user interface that includes at least the comprehensive score for the first patent.

O: The system as claim N recites, the operations further comprising: generating differential scores for the plurality of claims, a differential score of the differential scores being based at least in part on differences between words included in the respective claim and words included in at least one other claim of the plurality of claims; generating an overall differential score for the first patent using the differential scores for the plurality claims; and generating a third score associated with the first patent by comparing the overall differential score to at least one other overall differential score associated with the at least the second patent, wherein generating the comprehensive score is further based at least in part on the third score.

P: The system as paragraph O recites, wherein generating the comprehensive score comprises calculating an average of the first score, the second score, and the third score.

Q: The system as either paragraph O or paragraph P recites, the acts further comprising: calculating a first weighted score based at least in part on the first score and a first weight; calculating a second weighted score based at least in part on the second score and a second weight; and calculating a third weighted score based at least in part on the third score and a third weight, wherein generating the comprehensive score comprises calculating an average of the first weighted score, the second weighted score, and the third weighted score.

R: The system as any one of paragraphs N-Q recites, the operations further comprising: generating respective overall breadth scores for respective patents of the plurality of patents, the respective overall breadth scores including the at least one other overall breadth score, wherein generating the first score comprises calculating a percentage of patents from the plurality of patents that include a respective overall breadth score that is less than or equal to the overall breadth score of the first patent.

S: The system as any one of paragraphs N-R recites, wherein generating the value comprises generating a first value representing a number of independent claims included in the plurality of claims and generating a second value representing a number of dependent claims included in the plurality of claims, and the operations further comprising: comparing the first value to at least one other first value representing a number of independent claims included in the at least the second patent; comparing the second value to at least one other second value representing a number of dependent claims included in the at least the second patent, wherein generating the second score comprises calculating the second score based at least in part on comparing the first value to the at least one other first value and comparing the second value to the at least one other second value.

T: The system as any one of paragraphs N-S recites, the operations further comprising: generating respective values representing a number of claims included in respective patents of the plurality of patents, the respective values including the at least one other value, wherein generating the second score comprises calculating a percentage of patents from the plurality of patents that include a respective value that is less than or equal to the value of the first patent.

The invention claimed is:

1. A system comprising:
one or more processors; and
one or more computer-readable media storing instructions that, when executed by the one or more processors, cause the one or more processor to perform operations comprising:
receiving intellectual-property assets from one or more data repositories, individual ones of the intellectual-property assets including respective portions of text;
generating, for an intellectual-property asset of the intellectual-property assets, a word count score for individual ones of the portions of text based at least in part on a comparison between a word count associated with the respective portion of text and word counts associated with portions of text from at least one other intellectual-property asset of the intellectual-property assets;
identifying one or more words included in the respective portion of text;
identifying differences between the one or more words included in the respective portion of text and one or more words in the portions of text from the at least one other IP asset;
identifying similarities between the one or more words included in the respective portion of text and the one or more words in the portions of text from the at least one other IP asset;
generating a differential score for the individual ones of the portions of text, the differential score for a respective portion of text being based at least in part on the word count score, the differences between the one or more words included in the respective portion of text and the one or more words included in the portions of text from the at least one other IP asset, and the similarities between the one or more words included in the respective portion of text and one or more words in the portions of text from the at least one other IP asset;
generating an overall differentiation score for the individual ones of the intellectual-property assets based at least in part on an average of the differential scores for the individual ones of the portions of text;
generating a comparative differentiation score for the intellectual-property assets based at least in part on comparing the overall differentiation score of an individual intellectual-property asset to additional overall differentiation scores of the intellectual-property assets;
generating a ranking for the intellectual-property assets based at least in part on the comparative differentiation score for the intellectual-property assets; and
generating a user interface that includes at least the comparative differentiation scores for the intellectual-property assets, the user interface causing display of the intellectual-property assets based at least in part on the ranking.

2. The system of claim 1, the operations further comprising:
generating the overall differentiation score for the intellectual-property asset by taking an average of the differentiation scores for the portions of text; and
generating the respective overall differentiation scores for respective intellectual-property assets of the intellectual-property assets,
wherein generating the comparative differentiation score comprises generating a percentage of intellectual-property assets from the intellectual-property assets that include a respective overall differentiation score that is less favorable or equally favorable to the overall differentiation score of the intellectual-property asset.

3. The system of claim 1, the operations further comprising:
generating a commonness score for the individual ones of the portions of text based at least in part on a frequency in which words within the respective portion of text are found in the portions of text from the at least one other intellectual-property asset;
generating a breadth score for the individual ones of the portions of text based at least in part on the word count score and the commonness score for the respective portion of text;
generating an overall breadth score for the intellectual-property asset based at least in part on the breadth scores for the portions of text;
generating a comparative breadth score for the intellectual-property assets based at least in part on the overall breadth scores of the intellectual-property related assets; and
generating a user interface that includes at least the comparative breadth scores for the intellectual-property assets.

4. The system of claim 3, the operations further comprising:
generating the respective overall breadth scores for respective intellectual-property assets of the intellectual-property assets,
wherein generating the comparative breadth score comprises generating a percentage of intellectual-property assets from the intellectual-property assets that include a respective overall breadth score that is less favorable or equally favorable to the overall breadth score of the intellectual-property asset.

5. The system of claim 3, the operations further comprising:
generating a portion score for the individual ones of the intellectual-property assets based at least in part on a value corresponding to a number of portions of text that are included in the portions of text of the intellectual-property asset;
generating a comparative portion score for the intellectual-property assets based at least in part on the portion scores of the intellectual-property assets; and
generating a user interface that includes at least the comparative portion score for the intellectual-property asset.

6. The system of claim 5, the operations further comprising:
generating the respective portion scores for respective intellectual-property related assets of the intellectual property related assets,
wherein generating the comparative portion score comprises generating a percentage of intellectual-property assets from the intellectual-property assets that include a respective value that is less favorable or equally favorable to the portion score of the intellectual property related asset.

7. The system of claim 5, the operations further comprising:

generating a comprehensive score for the intellectual-property asset based at least in part on the overall differentiation score, the overall breadth score, and the portion score, the comprehensive score representing a favorability of the intellectual-property asset with respect to the intellectual-property assets; and generating a user interfaces that includes at least the comprehensive score for the intellectual-property asset.

8. The system of claim 7, wherein generating the comprehensive score for the intellectual-property asset comprises generating an average of the overall differentiation score, the overall breadth score, and the portion score.

9. The system of claim 7, the operations further comprising:

generating a weighted differentiation score by multiplying the overall differentiation score by a first weight;

generating a weighted breadth score by multiplying the overall breadth score by a second weight, wherein the second weight is different than the first weight; and generating a weighted portion score by multiplying the portion score by a third weight, wherein the third weight is different than at least one of the first weight or the second weight, wherein generating the comprehensive score for the intellectual-property asset is based at least in part on the weighted differentiation score, the weighted breadth score, and the weighted portion score.

10. The system of claim 9, wherein generating the comprehensive score for the intellectual-property asset comprises generating an average of the weighted differentiation score, the weighted breadth score, and the weighted portion score.

11. A method comprising receiving, by one or more processors, intellectual-property assets from one or more data repositories, individual ones of the intellectual-property assets including respective portions of text;

generating, by the one or more processors and for an intellectual-property asset of the intellectual-property assets, a word count score for individual ones of the portions of text based at least in part on a comparison between a word count associated with the respective portion of text and word counts associated with portions of text from at least one other intellectual-property asset of the intellectual-property assets;

identifying, by the one or more processors, one or more words included in the respective portion of text;

identifying, by the one or more processors, differences between the one or more words included in the respective portion of text and one or more words in the portions of text from the at least one other IP asset;

identifying similarities between the one or more words included in the respective portion of text and the one or more words in the portions of text from the at least one other IP asset;

generating, by the one or more processors, a differential score for the individual ones of the portions of text, the differential score for a respective portion of text being based at least in part on the word count score, the differences between the one or more words included in the respective portion of text and the one or more words included in the portions of text from the at least one other IP asset, and the similarities between the one or more words included in the respective portion of text and one or more words in the portions of text from the at least one other IP asset;

generating, by the one or more processors, an overall differentiation score for the individual ones of the intellectual-property assets based at least in part on an average of the differential scores for the individual ones of the portions of text;

generating, by the one or more processors, a comparative differentiation score for the intellectual-property assets based at least in part on comparing the overall differentiation score of an individual intellectual-property asset to additional overall differential scores of the intellectual-property assets;

generating, by the one or more processors, a ranking for the intellectual-property assets based at least in part on the comparative differentiation score for the intellectual-property assets; and generating, by the one or more processors, a user interface that includes at least the comparative differentiation scores for the intellectual-property assets, the user interface causing display of the intellectual-property assets based at least in part on the ranking.

12. The method of claim 11, further comprising:

generating the overall differentiation score for the intellectual-property asset by taking an average of the differentiation scores for the portions of text; and generating the respective overall differentiation scores for respective intellectual-property assets of the intellectual-property assets, wherein generating the comparative differentiation score comprises generating a percentage of intellectual-property assets from the intellectual-property assets that include a respective overall differentiation score that is less favorable or equally favorable to the overall differentiation score of the intellectual-property asset.

13. The method of claim 11, further comprising:

generating a commonness score for the individual ones of the portions of text based at least in part on a frequency in which words within the respective portion of text are found in the portions of text from the at least one other intellectual-property asset;

generating a breadth score for the individual ones of the portions of text based at least in part on the word count score and the commonness score for the respective portion of text;

generating an overall breadth score for the intellectual-property asset based at least in part on the breadth scores for the portions of text;

generating a comparative breadth score for the intellectual-property assets based at least in part on the overall breadth scores of the intellectual-property related assets; and generating a user interface that includes at least the comparative breadth scores for the intellectual-property assets.

14. The method of claim 13, further comprising:

generating the respective overall breadth scores for respective intellectual-property assets of the intellectual-property assets, wherein generating the comparative breadth score comprises generating a percentage of intellectual-property assets from the intellectual-property assets that include a respective overall breadth score that is less favorable or equally favorable to the overall breadth score of the intellectual-property asset.

15. The method of claim 13, further comprising:

generating a portion score for the individual ones of the intellectual-property assets based at least in part on a value corresponding to a number of portions of text that are included in the portions of text of the intellectual-property asset;

generating a comparative portion score for the intellectual-property assets based at least in part on the portion scores of the intellectual-property assets; and generating a user interface that includes at least the comparative portion score for the intellectual-property asset.

16. The method of claim 15, further comprising:

generating the respective portion scores for respective intellectual-property related assets of the intellectual property related assets, wherein generating the comparative portion score comprises generating a percentage of intellectual-property assets from the intellectual-property assets that include a respective value that is less favorable or equally favorable to the portion score of the intellectual property related asset.

17. The method of claim 15, further comprising:

generating a comprehensive score for the intellectual-property asset based at least in part on the overall differentiation score, the overall breadth score, and the portion score, the comprehensive score representing a favorability of the intellectual-property asset with respect to the intellectual-property assets; and generating a user interfaces that includes at least the comprehensive score for the intellectual-property asset.

18. The method of claim 17, wherein generating the comprehensive score for the intellectual-property asset comprises generating an average of the overall differentiation score, the overall breadth score, and the portion score.

19. The method of claim 17, further comprising:

generating a weighted differentiation score by multiplying the overall differentiation score by a first weight;

generating a weighted breadth score by multiplying the overall breadth score by a second weight, wherein the second weight is different than the first weight; and generating a weighted portion score by multiplying the portion score by a third weight, wherein the third weight is different than at least one of the first weight or the second weight, wherein generating the comprehensive score for the intellectual-property asset is based at least in part on the weighted differentiation score, the weighted breadth score, and the weighted portion score.

20. The system of claim 19, wherein generating the comprehensive score for the intellectual-property asset comprises generating an average of the weighted differentiation score, the weighted breadth score, and the weighted portion score.

* * * * *